US012263623B2

(12) United States Patent
Lämsä

(10) Patent No.: US 12,263,623 B2
(45) Date of Patent: Apr. 1, 2025

(54) LOOP MOLD FOR WEARABLE DEVICE MANUFACTURING

(71) Applicant: Oura Health Oy, Oulu (FI)

(72) Inventor: Antti Kalevi Lämsä, Oulu (FI)

(73) Assignee: Oura Health Oy, Oulu (FI)

( * ) Notice: Subject to any disclaimer, the term of this patent is extended or adjusted under 35 U.S.C. 154(b) by 0 days.

(21) Appl. No.: 18/153,324

(22) Filed: Jan. 11, 2023

(65) Prior Publication Data

US 2024/0227260 A1 Jul. 11, 2024

(51) Int. Cl.
 *B29C 45/14* (2006.01)
 *B29K 63/00* (2006.01)
 *B29L 31/00* (2006.01)

(52) U.S. Cl.
 CPC .... *B29C 45/14221* (2013.01); *B29C 45/1459* (2013.01); *B29K 2063/00* (2013.01); *B29L 2031/743* (2013.01)

(58) Field of Classification Search
 CPC ............... B29C 45/14; B29C 45/1459; B29C 45/14221; B29C 45/14245; B29C 45/14278
 See application file for complete search history.

(56) References Cited

U.S. PATENT DOCUMENTS

| 2015/0220109 A1* | 8/2015 | von Badinski | G06V 10/751 |
| | | | 368/10 |
| 2017/0042477 A1* | 2/2017 | Haverinen | A61B 5/6826 |

* cited by examiner

*Primary Examiner* — Yunju Kim
(74) *Attorney, Agent, or Firm* — Holland & Hart LLP

(57) ABSTRACT

Methods, systems, and devices for manufacturing of a wearable ring device are described. Generally, the techniques described herein may support a manufacturing process that reduces manufacturing complexities and deformities. For example, a deformable band may be positioned (e.g., by a manufacturing system) through an inner circumference of an inner housing of a wearable ring device. The manufacturing system may stretch the deformable band to create tension across at least a portion of the inner housing member, the tension including at least axial tension across one or more cutouts in the inner housing member. Accordingly, the manufacturing system may inject a fillable material through an opening in the wearable ring device, such that the fillable material fills a cavity between the inner housing member and an outer housing member of the wearable device and fills the one or more cutouts, contacting the deformable band, without further deforming the deformable band.

11 Claims, 7 Drawing Sheets

LOOP MOLD FOR WEARABLE DEVICE MANUFACTURING

FIELD OF TECHNOLOGY

The following relates to wearable devices, including a loop mold for use in manufacturing of wearable devices.

BACKGROUND

Some wearable devices may be configured to collect physiological data from users, including heart rate, motion data, temperature data, photoplethysmogram (PPG) data, and the like. In some cases, some wearable devices may perform various actions, such as providing certain health insights to users, based on acquired physiological data in order to assist the user with improving their overall health.

Methods for manufacturing wearable devices may include injecting a portion of the wearable device with a filler material (e.g., an epoxy material). However, molds used in such manufacturing processes may lead to irregularities in surface finish, may be costly, may be difficult to position to create a consistent product, among other potential deficiencies.

DETAILED DESCRIPTION

Figure 1:
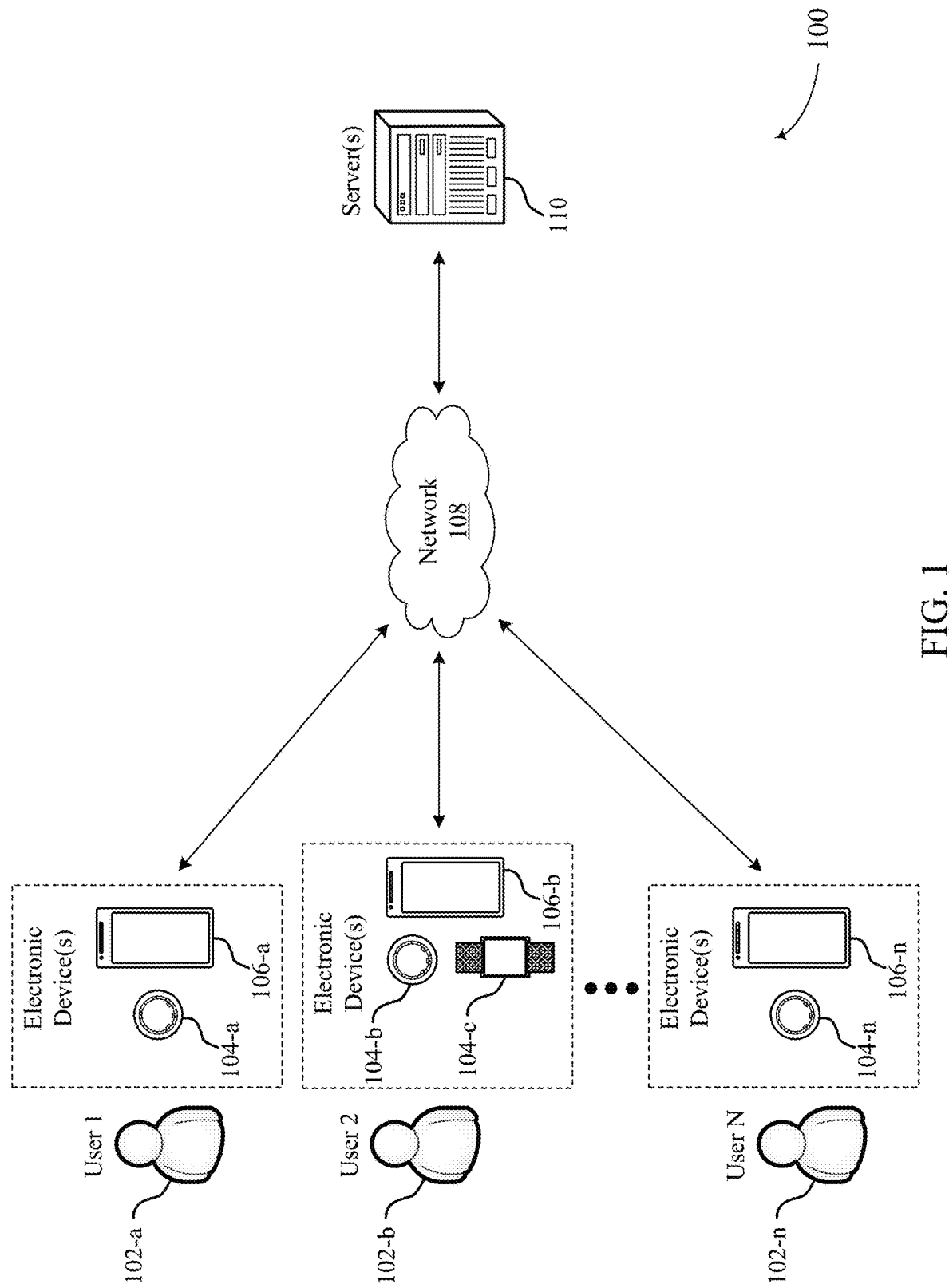
FIG. 1 illustrates an example of a system that supports a loop mold for wearable device manufacturing in accordance with aspects of the present disclosure.

An individual may use a wearable device (e.g., a wearable ring device) to collect, monitor, and track physiological data of the individual based on sensor measurements of the wearable ring device. Examples of physiological data may include temperature data, heart rate data, photoplethysmography (PPG) data, and the like. The physiological data collected, monitored, and tracked via the wearable ring device may be used to gain health insights about the user.

In some cases, one or more sensors of the wearable ring device may be located between an inner housing of the wearable ring device and an outer housing of the wearable ring device. In such cases, a fillable material may be injected between the inner housing and the outer housing during manufacturing to secure the one or more sensors in place. However, the inner housing may include one or more cutouts to enable the one or more sensors access (e.g., physical, optical, or otherwise) to skin of the user, and the one or more cutouts may allow the fillable material to leak outside of the inner housing of the wearable ring device during injection.

As such, a cylinder mold (e.g., plug) may be placed within the inner housing of the wearable ring device, such that the cylinder mold presses against the inner housing of the wearable ring device in a radial direction (e.g., the direction of the force applied by the cylinder mold is radial), creating a radial force to seal the one or more cutouts. However, in some cases, the radial force created by the cylinder mold may exceed a first threshold (e.g., the cylinder mold is too tight) such that the cylinder mold may push (e.g., extend) into the one or more cutouts (e.g., creating a bump effect). In such cases, the fillable material may not fill the entirety of the one or more cutouts, resulting in manufacturing deformities (e.g., air gaps between the fillable material and skin of the user when the wearable ring device is worn) that may impact the accuracy of physiological data collected via the one or more sensors. Alternatively, the radial force created by the cylinder mold may fail to exceed a second threshold (e.g., the cylinder mold is too loose) such that the fillable material may leak outside of the inner housing of the wearable ring device during injection, resulting in manufacturing deformities that may require additional manufacturing to remove (e.g., polishing, etching, sanding).

Additionally, or alternatively, the inner housing may be asymmetrical, and the cylinder mold may also be asymmetrical to mirror the asymmetries of the inner housing. In such cases, the cylinder mold may need to be properly positioned within the inner housing of the wearable ring device such that the asymmetries of the inner housing align with the asymmetries of the cylinder mold, resulting in manufacturing complexities or, if misaligned, manufacturing deformities. Further, a size of the cylinder mold may depend on a size of the wearable ring device (e.g., if there are multiple ring sizes being manufactured), resulting in additional manufacturing complexities and costs.

Accordingly, aspects of the present disclosure may support a manufacturing process that reduces manufacturing complexities and deformities. That is, a manufacturing system may utilize a deformable band (e.g., loop mold) that is positioned against the inner housing of the wearable ring device to create axial tension at the one or more cutouts, sealing the one or more cutouts, thus enabling the wearable ring device to be injected with the fillable material (e.g., an epoxy or similar material) with a reduced likelihood of manufacturing deformities and reduced manufacturing complexity. For example, the deformable band (e.g., an elastic material formed in a loop) may be positioned through an inner circumference of the inner housing of the wearable ring device, such that the deformable band extends on either side of the wearable ring device. Additionally, a stretching system may be positioned within the deformable band. The stretching system may include four stretching members, that may be referred to as arms, configured in two sets of arms, each set of arms including two arms. A first set of arms may be positioned within the deformable band at a first end of the deformable band, on a first side of the ring, and a second set of arms may be positioned within the deformable band at a second end of the deformable band, on a second side of the ring, the first end being opposite the second end. Additionally, the arms within each set of arms may be positioned (e.g., stacked) vertically. That is, a first arm from the first set of arms may be aligned above (e.g., on top of) a second arm from the first set of arms. The second set of arms may be positioned in a similar manner.

Additionally, each arm may include a straight portion of the arm followed by a curved portion of the arm, where a curve of the curved portion of the arm is based on a size of the wearable ring device. That is, the curve of the curved portion of the arm may mirror (e.g., according to a ratio or some other geometric characteristic) a curve of the wearable ring device. Accordingly, a curved portion of the first arm from the first set of arms may curve away from a curved portion of the second arm from the first set of arms, such that the first arm and the second arm, in combination, form a circular orientation. That is, each curved portion may align with a curve of the wearable ring device. The second set of arms may be positioned in a similar manner. Additionally, the straight portion of each arm may be attached to an apparatus that may enable the arms to be moved (e.g., the apparatus may move the arms).

As such, one or more components of the stretching system may move to apply a force to the deformable band, stretching the deformable band. For example, the first arm from the first set of arms may move upward (e.g., vertically) while the second arm from the first set of arms moves downward (e.g., vertically, in a direction opposite the first arm from the first set of arms). A first arm from the second set of arms may also move upward, mirroring the first arm from the first set of arms, and a second arm from the second set of arms may move downward, mirroring the second arm from the first set of arms. Additionally, or alternatively, the first set of arms and the second set of arms may move towards the wearable ring device (e.g., the first set of arms may move laterally in a direction opposite the second set of arms). In other words, each arm from the sets of arms may move in a lateral direction, a vertical direction, or both, and one or more lateral directions, one or more vertical direction, or both, may be similar among two or more arms.

Accordingly, the deformable band may stretch based on the movement of the arms, such that tension is created across at least a portion of the inner housing of the wearable ring device. That is, the deformable band may create, at least, axial tension (e.g., an axial force) across the one or more cutouts, sealing the one or more cutouts. As such, a fillable material may be injected through an opening in the wearable ring device to fill a cavity between the inner housing and the outer housing, securing the one or more sensors in place. Additionally, the fillable material may fill the one or more cutouts and contact the deformable band, without further deforming the deformable band (e.g., without creating manufacturing deformities). For example, the axial tension may create a seal against the one or more cutouts that is flush with the adjacent surface of the inner housing, which may prevent manufacturing deformities associated with using an inner plug mold that creates a seal using radial expansion force.

In some cases, the deformable band may be stretched according to a tension threshold and the fillable material may be injected according to a pressure threshold, such that a pressure created at the one or more cutouts by injection of the fillable material is within a threshold of the tension (e.g., does not overcome the force of the seal created by the deformable band) created at the one or more cutouts by the deformable band. Such balancing may support filling of the one or more cutouts without further deforming the deformable band. In such cases, the tension threshold, the pressure threshold, or both, may be based on a speed at which the fillable material is injected, a temperature of the fillable material, a material of the deformable band, the fillable material, a size of the wearable ring device, a size of the one or more cutouts, a quantity of the one or more cutouts, the axial tension across the one or more cutouts in the inner housing member, or any combination thereof.

Although the examples described herein are related to manufacturing a wearable ring device, it should be understood that the described techniques and devices may be applied to manufacturing processes related to other devices or items, such as other wearables (e.g., watches, bands), or other electronic devices that are not considered wearables.

Aspects of the disclosure are initially described in the context of systems supporting physiological data collection from users via wearable devices that are manufactured in accordance with the described aspects. Aspects are then described in the context of manufacturing systems. Aspects of the disclosure are further illustrated by and described with reference to flowcharts that relate to a loop mold for wearable device manufacturing.

FIG. 1 illustrates an example of a system 100 that supports a manufacturing process that reduces manufacturing complexities and deformities in accordance with aspects of the present disclosure. The system 100 includes a plurality of electronic devices (e.g., wearable devices 104, user devices 106) that may be worn and/or operated by one or more users 102. The system 100 further includes a network 108 and one or more servers 110.

The electronic devices may include any electronic devices known in the art, including wearable devices 104 (e.g., ring wearable devices, watch wearable devices, etc.), user devices 106 (e.g., smartphones, laptops, tablets). The electronic devices associated with the respective users 102 may include one or more of the following functionalities: 1) measuring physiological data, 2) storing the measured data, 3) processing the data, 4) providing outputs (e.g., via GUIs) to a user 102 based on the processed data, and 5) communicating data with one another and/or other computing devices. Different electronic devices may perform one or more of the functionalities.

Example wearable devices 104 may include wearable computing devices, such as a ring computing device (hereinafter "ring") configured to be worn on a user's 102 finger, a wrist computing device (e.g., a smart watch, fitness band, or bracelet) configured to be worn on a user's 102 wrist, and/or a head mounted computing device (e.g., glasses/goggles). Wearable devices 104 may also include bands, straps (e.g., flexible or inflexible bands or straps), stick-on sensors, and the like, that may be positioned in other locations, such as bands around the head (e.g., a forehead headband), arm (e.g., a forearm band and/or bicep band), and/or leg (e.g., a thigh or calf band), behind the ear, under the armpit, and the like. Wearable devices 104 may also be attached to, or included in, articles of clothing. For example, wearable devices 104 may be included in pockets and/or pouches on clothing. As another example, wearable device 104 may be clipped and/or pinned to clothing, or may otherwise be maintained within the vicinity of the user 102. Example articles of clothing may include, but are not limited to, hats, shirts, gloves, pants, socks, outerwear (e.g., jackets), and undergarments. In some implementations, wearable devices 104 may be included with other types of devices such as training/sporting devices that are used during physical activity. For example, wearable devices 104 may be attached to, or included in, a bicycle, skis, a tennis racket, a golf club, and/or training weights.

Much of the present disclosure may be described in the context of a ring wearable device 104. Accordingly, the terms "ring 104," "wearable device 104," and like terms, may be used interchangeably, unless noted otherwise herein. However, the use of the term "ring 104" is not to be regarded as limiting, as it is contemplated herein that aspects of the present disclosure may be performed using other wearable devices (e.g., watch wearable devices, necklace wearable device, bracelet wearable devices, earring wearable devices, anklet wearable devices, and the like).

In some aspects, user devices 106 may include handheld mobile computing devices, such as smartphones and tablet computing devices. User devices 106 may also include personal computers, such as laptop and desktop computing devices. Other example user devices 106 may include server computing devices that may communicate with other electronic devices (e.g., via the Internet). In some implementations, computing devices may include medical devices, such as external wearable computing devices (e.g., Holter monitors). Medical devices may also include implantable medical devices, such as pacemakers and cardioverter defibrillators. Other example user devices 106 may include home computing devices, such as internet of things (IoT) devices (e.g., IoT devices), smart televisions, smart speakers, smart displays (e.g., video call displays), hubs (e.g., wireless communication hubs), security systems, smart appliances (e.g., thermostats and refrigerators), and fitness equipment.

Some electronic devices (e.g., wearable devices 104, user devices 106) may measure physiological parameters of respective users 102, such as photoplethysmography waveforms, continuous skin temperature, a pulse waveform, respiration rate, heart rate, heart rate variability (HRV), actigraphy, galvanic skin response, pulse oximetry, and/or other physiological parameters. Some electronic devices that measure physiological parameters may also perform some/all of the calculations described herein. Some electronic devices may not measure physiological parameters, but may perform some/all of the calculations described herein. For example, a ring (e.g., wearable device 104), mobile device application, or a server computing device may process received physiological data that was measured by other devices.

In some implementations, a user 102 may operate, or may be associated with, multiple electronic devices, some of which may measure physiological parameters and some of which may process the measured physiological parameters. In some implementations, a user 102 may have a ring (e.g., wearable device 104) that measures physiological parameters. The user 102 may also have, or be associated with, a user device 106 (e.g., mobile device, smartphone), where the wearable device 104 and the user device 106 are communicatively coupled to one another. In some cases, the user device 106 may receive data from the wearable device 104 and perform some/all of the calculations described herein. In some implementations, the user device 106 may also measure physiological parameters described herein, such as motion/activity parameters.

For example, as illustrated in FIG. 1, a first user 102-*a* (User 1) may operate, or may be associated with, a wearable device 104-*a* (e.g., ring 104-*a*) and a user device 106-*a* that may operate as described herein. In this example, the user device 106-*a* associated with user 102-*a* may process/store physiological parameters measured by the ring 104-*a*. Comparatively, a second user 102-*b* (User 2) may be associated with a ring 104-*b*, a watch wearable device 104-*c* (e.g., watch 104-*c*), and a user device 106-*b*, where the user device 106-*b* associated with user 102-*b* may process/store physiological parameters measured by the ring 104-*b* and/or the watch 104-*c*. Moreover, an nth user 102-*n* (User N) may be associated with an arrangement of electronic devices described herein (e.g., ring 104-*n*, user device 106-*n*). In some aspects, wearable devices 104 (e.g., rings 104, watches 104) and other electronic devices may be communicatively coupled to the user devices 106 of the respective users 102 via Bluetooth, Wi-Fi, and other wireless protocols.

In some implementations, the rings 104 (e.g., wearable devices 104) of the system 100 may be configured to collect physiological data from the respective users 102 based on arterial blood flow within the user's finger. In particular, a ring 104 may utilize one or more light-emitting components, such as LEDs (e.g., red LEDs, green LEDs) that emit light on the palm-side of a user's finger to collect physiological data based on arterial blood flow within the user's finger. In general, the terms light-emitting components, light-emitting elements, and like terms, may include, but are not limited to, LEDs, micro LEDs, mini LEDs, laser diodes (LDs), and the like.

In some cases, the system 100 may be configured to collect physiological data from the respective users 102 based on blood flow diffused into a microvascular bed of skin with capillaries and arterioles. For example, the system 100 may collect PPG data based on a measured amount of blood diffused into the microvascular system of capillaries and arterioles. In some implementations, the ring 104 may acquire the physiological data using a combination of both green and red LEDs. The physiological data may include any physiological data known in the art including, but not limited to, temperature data, accelerometer data (e.g., movement/motion data), heart rate data, HRV data, blood oxygen level data, or any combination thereof.

The use of both green and red LEDs may provide several advantages over other solutions, as red and green LEDs have been found to have their own distinct advantages when acquiring physiological data under different conditions (e.g., light/dark, active/inactive) and via different parts of the body, and the like. For example, green LEDs have been found to exhibit better performance during exercise. Moreover, using multiple LEDs (e.g., green and red LEDs) distributed around the ring 104 has been found to exhibit superior performance as compared to wearable devices that utilize LEDs that are positioned close to one another, such as within a watch wearable device. Furthermore, the blood vessels in the finger (e.g., arteries, capillaries) are more accessible via LEDs as compared to blood vessels in the wrist. In particular, arteries in the wrist are positioned on the bottom of the wrist (e.g., palm-side of the wrist), meaning only capillaries are accessible on the top of the wrist (e.g., back of hand side of the wrist), where wearable watch devices and similar devices are typically worn. As such, utilizing LEDs and other sensors within a ring 104 has been found to exhibit superior performance as compared to wearable devices worn on the wrist, as the ring 104 may have greater access to arteries (as compared to capillaries), thereby resulting in stronger signals and more valuable physiological data.

The electronic devices of the system 100 (e.g., user devices 106, wearable devices 104) may be communicatively coupled to one or more servers 110 via wired or wireless communication protocols. For example, as shown in FIG. 1, the electronic devices (e.g., user devices 106) may be communicatively coupled to one or more servers 110 via a network 108. The network 108 may implement transfer control protocol and internet protocol (TCP/IP), such as the Internet, or may implement other network 108 protocols. Network connections between the network 108 and the respective electronic devices may facilitate transport of data via email, web, text messages, mail, or any other appropriate form of interaction within a computer network 108. For example, in some implementations, the ring 104-*a* associated with the first user 102-*a* may be communicatively coupled to the user device 106-*a*, where the user device 106-*a* is communicatively coupled to the servers 110 via the network 108. In additional or alternative cases, wearable devices 104 (e.g., rings 104, watches 104) may be directly communicatively coupled to the network 108.

The system 100 may offer an on-demand database service between the user devices 106 and the one or more servers 110. In some cases, the servers 110 may receive data from the user devices 106 via the network 108, and may store and analyze the data. Similarly, the servers 110 may provide data to the user devices 106 via the network 108. In some cases, the servers 110 may be located at one or more data centers. The servers 110 may be used for data storage, management, and processing. In some implementations, the servers 110 may provide a web-based interface to the user device 106 via web browsers.

In some aspects, the system 100 may detect periods of time that a user 102 is asleep, and classify periods of time that the user 102 is asleep into one or more sleep stages (e.g., sleep stage classification). For example, as shown in FIG. 1, User 102-a may be associated with a wearable device 104-a (e.g., ring 104-a) and a user device 106-a. In this example, the ring 104-a may collect physiological data associated with the user 102-a, including temperature, heart rate, HRV, respiratory rate, and the like. In some aspects, data collected by the ring 104-a may be input to a machine learning classifier, where the machine learning classifier is configured to determine periods of time that the user 102-a is (or was) asleep. Moreover, the machine learning classifier may be configured to classify periods of time into different sleep stages, including an awake sleep stage, a rapid eye movement (REM) sleep stage, a light sleep stage (non-REM (NREM)), and a deep sleep stage (NREM). In some aspects, the classified sleep stages may be displayed to the user 102-a via a GUI of the user device 106-a. Sleep stage classification may be used to provide feedback to a user 102-a regarding the user's sleeping patterns, such as recommended bedtimes, recommended wake-up times, and the like. Moreover, in some implementations, sleep stage classification techniques described herein may be used to calculate scores for the respective user, such as Sleep Scores, Readiness Scores, and the like.

In some aspects, the system 100 may utilize circadian rhythm-derived features to further improve physiological data collection, data processing procedures, and other techniques described herein. The term circadian rhythm may refer to a natural, internal process that regulates an individual's sleep-wake cycle, that repeats approximately every 24 hours. In this regard, techniques described herein may utilize circadian rhythm adjustment models to improve physiological data collection, analysis, and data processing. For example, a circadian rhythm adjustment model may be input into a machine learning classifier along with physiological data collected from the user 102-a via the wearable device 104-a. In this example, the circadian rhythm adjustment model may be configured to "weight," or adjust, physiological data collected throughout a user's natural, approximately 24-hour circadian rhythm. In some implementations, the system may initially start with a "baseline" circadian rhythm adjustment model, and may modify the baseline model using physiological data collected from each user 102 to generate tailored, individualized circadian rhythm adjustment models that are specific to each respective user 102.

In some aspects, the system 100 may utilize other biological rhythms to further improve physiological data collection, analysis, and processing by phase of these other rhythms. For example, if a weekly rhythm is detected within an individual's baseline data, then the model may be configured to adjust "weights" of data by day of the week. Biological rhythms that may require adjustment to the model by this method include: 1) ultradian (faster than a day rhythms, including sleep cycles in a sleep state, and oscillations from less than an hour to several hours periodicity in the measured physiological variables during wake state; 2) circadian rhythms; 3) non-endogenous daily rhythms shown to be imposed on top of circadian rhythms, as in work schedules; 4) weekly rhythms, or other artificial time periodicities exogenously imposed (e.g., in a hypothetical culture with 12 day "weeks," 12 day rhythms could be used); 5) multi-day ovarian rhythms in women and spermatogenesis rhythms in men; 6) lunar rhythms (relevant for individuals living with low or no artificial lights); and 7) seasonal rhythms.

The biological rhythms are not always stationary rhythms. For example, many women experience variability in ovarian cycle length across cycles, and ultradian rhythms are not expected to occur at exactly the same time or periodicity across days even within a user. As such, signal processing techniques sufficient to quantify the frequency composition while preserving temporal resolution of these rhythms in physiological data may be used to improve detection of these rhythms, to assign phase of each rhythm to each moment in time measured, and to thereby modify adjustment models and comparisons of time intervals. The biological rhythm-adjustment models and parameters can be added in linear or non-linear combinations as appropriate to more accurately capture the dynamic physiological baselines of an individual or group of individuals.

In some aspects, the respective devices of the system 100 may support a manufacturing process (e.g., and system) that reduces manufacturing complexities and deformities. For example, a ring 104, such as the ring 104-a, the ring 104-b, the ring 104-n, or any combination thereof, may include an inner housing (e.g., inner housing member) and an outer housing (e.g., outer housing member), where the inner housing includes one or more cutouts. In such cases, a cavity may exist between the inner housing and the outer housing, where one or more sensors are positioned in the cavity with reference to the one or more cutouts (e.g., aligned with the one or more cutouts). In such cases, a manufacturing process may include, at least, a molding process to enable a fillable material to be injected into the cavity of the ring 104, securing the one or more sensors in place, without producing manufacturing deformities at the one or more cutouts.

For example, a manufacturing system (e.g., including at least a stretching system and an injection system) may position a deformable band (e.g., loop) through an inner circumference of the inner housing of the ring 104. The manufacturing system (e.g., the stretching system) may stretch the deformable band to create tension across at least a portion of the inner housing, the tension including at least axial tension across the one or more cutouts in the inner housing. Accordingly, the manufacturing system (e.g., the injection system) may inject the fillable material through an opening in the ring 104 (e.g., through an opening in the outer housing), such that the fillable material may fill the one or more cutouts and contact the deformable band, securing the one or more sensors in place, without further deforming the deformable band.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
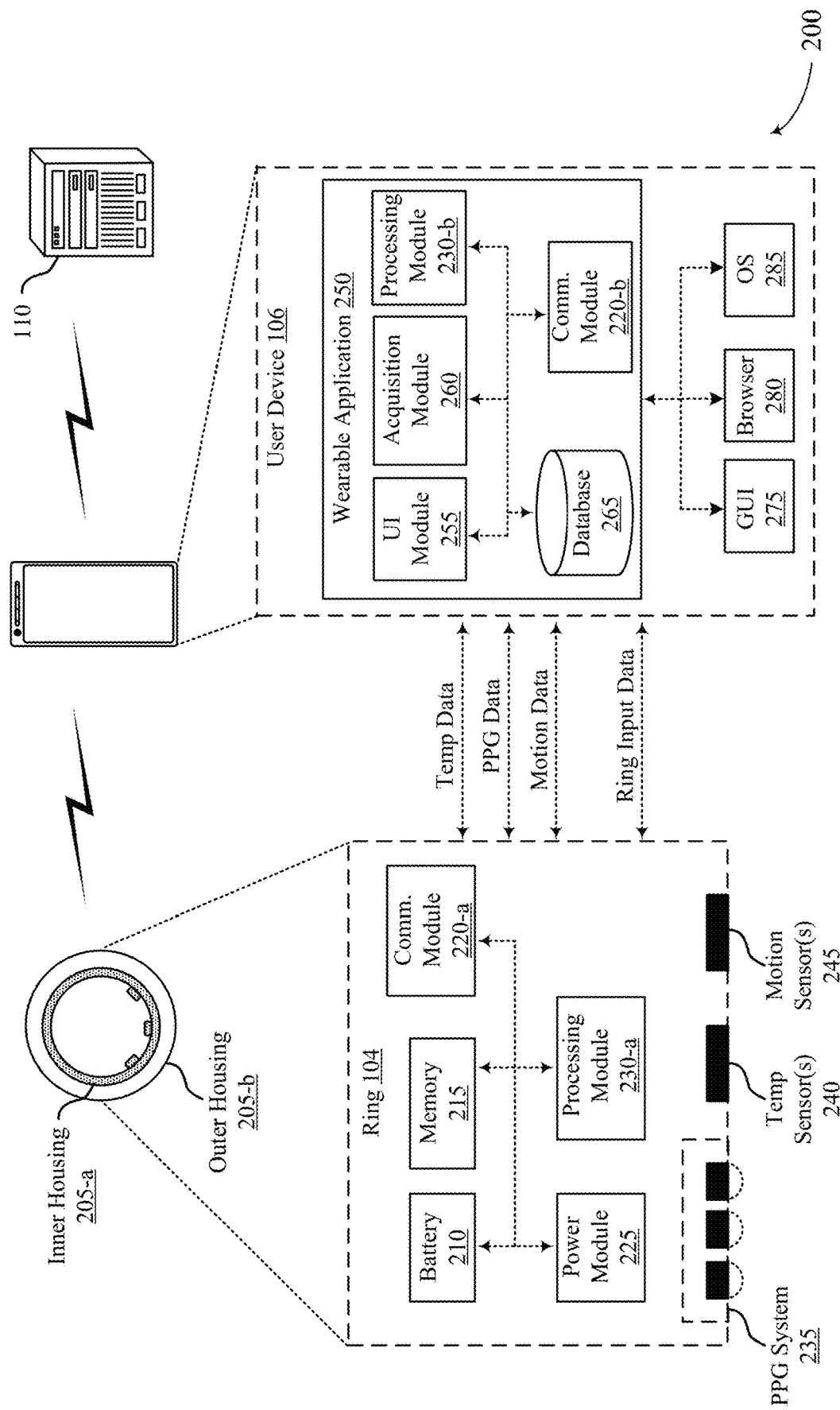
FIG. 2 illustrates an example of a system that supports a loop mold for wearable device manufacturing in accordance with aspects of the present disclosure.

FIG. 2 illustrates an example of a system 200 that supports a manufacturing process that reduces manufacturing complexities and deformities in accordance with aspects of the present disclosure. The system 200 may implement, or be implemented by, system 100. In particular, system 200 illustrates an example of a ring 104 (e.g., wearable device 104), a user device 106, and a server 110, as described with reference to FIG. 1.

In some aspects, the ring 104 may be configured to be worn around a user's finger, and may determine one or more user physiological parameters when worn around the user's finger. Example measurements and determinations may include, but are not limited to, user skin temperature, pulse waveforms, respiratory rate, heart rate, HRV, blood oxygen levels, and the like.

The system 200 further includes a user device 106 (e.g., a smartphone) in communication with the ring 104. For example, the ring 104 may be in wireless and/or wired communication with the user device 106. In some implementations, the ring 104 may send measured and processed data (e.g., temperature data, photoplethysmogram (PPG) data, motion/accelerometer data, ring input data, and the like) to the user device 106. The user device 106 may also send data to the ring 104, such as ring 104 firmware/configuration updates. The user device 106 may process data. In some implementations, the user device 106 may transmit data to the server 110 for processing and/or storage.

The ring 104 may include a housing 205 that may include an inner housing 205-a and an outer housing 205-b. In some aspects, the housing 205 of the ring 104 may store or otherwise include various components of the ring including, but not limited to, device electronics, a power source (e.g., battery 210, and/or capacitor), one or more substrates (e.g., printable circuit boards) that interconnect the device electronics and/or power source, and the like. The device electronics may include device modules (e.g., hardware/software), such as: a processing module 230-a, a memory 215, a communication module 220-a, a power module 225, and the like. The device electronics may also include one or more sensors. Example sensors may include one or more temperature sensors 240, a PPG sensor assembly (e.g., PPG system 235), and one or more motion sensors 245.

The sensors may include associated modules (not illustrated) configured to communicate with the respective components/modules of the ring 104, and generate signals associated with the respective sensors. In some aspects, each of the components/modules of the ring 104 may be communicatively coupled to one another via wired or wireless connections. Moreover, the ring 104 may include additional and/or alternative sensors or other components that are configured to collect physiological data from the user, including light sensors (e.g., LEDs), oximeters, and the like.

The ring 104 shown and described with reference to FIG. 2 is provided solely for illustrative purposes. As such, the ring 104 may include additional or alternative components as those illustrated in FIG. 2. Other rings 104 that provide functionality described herein may be fabricated. For example, rings 104 with fewer components (e.g., sensors) may be fabricated. In a specific example, a ring 104 with a single temperature sensor 240 (or other sensor), a power source, and device electronics configured to read the single temperature sensor 240 (or other sensor) may be fabricated. In another specific example, a temperature sensor 240 (or other sensor) may be attached to a user's finger (e.g., using a clamps, spring loaded clamps, etc.). In this case, the sensor may be wired to another computing device, such as a wrist worn computing device that reads the temperature sensor 240 (or other sensor). In other examples, a ring 104 that includes additional sensors and processing functionality may be fabricated.

The housing 205 may include one or more housing 205 components. The housing 205 may include an outer housing 205-b component (e.g., a shell) and an inner housing 205-a component (e.g., a molding). The housing 205 may include additional components (e.g., additional layers) not explicitly illustrated in FIG. 2. For example, in some implementations, the ring 104 may include one or more insulating layers that electrically insulate the device electronics and other conductive materials (e.g., electrical traces) from the outer housing 205-b (e.g., a metal outer housing 205-b). The housing 205 may provide structural support for the device electronics, battery 210, substrate(s), and other components. For example, the housing 205 may protect the device electronics, battery 210, and substrate(s) from mechanical forces, such as pressure and impacts. The housing 205 may also protect the device electronics, battery 210, and substrate(s) from water and/or other chemicals.

The outer housing 205-b may be fabricated from one or more materials. In some implementations, the outer housing 205-b may include a metal, such as titanium, that may provide strength and abrasion resistance at a relatively light weight. The outer housing 205-b may also be fabricated from other materials, such polymers. In some implementations, the outer housing 205-b may be protective as well as decorative.

The inner housing 205-a may be configured to interface with the user's finger. The inner housing 205-a may be formed from a polymer (e.g., a medical grade polymer) or other material. In some implementations, the inner housing 205-a may be transparent. For example, the inner housing 205-a may be transparent to light emitted by the PPG light emitting diodes (LEDs). In some implementations, the inner housing 205-a component may be molded onto the outer housing 205-b. For example, the inner housing 205-a may include a polymer that is molded (e.g., injection molded) to fit into an outer housing 205-b metallic shell.

The ring 104 may include one or more substrates (not illustrated). The device electronics and battery 210 may be included on the one or more substrates. For example, the device electronics and battery 210 may be mounted on one or more substrates. Example substrates may include one or more printed circuit boards (PCBs), such as flexible PCB (e.g., polyimide). In some implementations, the electronics/battery 210 may include surface mounted devices (e.g., surface-mount technology (SMT) devices) on a flexible PCB. In some implementations, the one or more substrates (e.g., one or more flexible PCBs) may include electrical traces that provide electrical communication between device electronics. The electrical traces may also connect the battery 210 to the device electronics.

The device electronics, battery 210, and substrates may be arranged in the ring 104 in a variety of ways. In some implementations, one substrate that includes device electronics may be mounted along the bottom of the ring 104 (e.g., the bottom half), such that the sensors (e.g., PPG system 235, temperature sensors 240, motion sensors 245, and other sensors) interface with the underside of the user's finger. In these implementations, the battery 210 may be included along the top portion of the ring 104 (e.g., on another substrate).

The various components/modules of the ring 104 represent functionality (e.g., circuits and other components) that may be included in the ring 104. Modules may include any discrete and/or integrated electronic circuit components that implement analog and/or digital circuits capable of producing the functions attributed to the modules herein. For example, the modules may include analog circuits (e.g., amplification circuits, filtering circuits, analog/digital conversion circuits, and/or other signal conditioning circuits). The modules may also include digital circuits (e.g., combinational or sequential logic circuits, memory circuits etc.).

The memory 215 (memory module) of the ring 104 may include any volatile, non-volatile, magnetic, or electrical media, such as a random access memory (RAM), read-only memory (ROM), non-volatile RAM (NVRAM), electrically-erasable programmable ROM (EEPROM), flash memory, or any other memory device. The memory 215 may store any of the data described herein. For example, the memory 215 may be configured to store data (e.g., motion data, temperature data, PPG data) collected by the respective sensors and PPG system 235. Furthermore, memory 215 may include instructions that, when executed by one or more processing circuits, cause the modules to perform various functions attributed to the modules herein. The device electronics of the ring 104 described herein are only example device electronics. As such, the types of electronic components used to implement the device electronics may vary based on design considerations.

The functions attributed to the modules of the ring 104 described herein may be embodied as one or more processors, hardware, firmware, software, or any combination thereof. Depiction of different features as modules is intended to highlight different functional aspects and does not necessarily imply that such modules must be realized by separate hardware/software components. Rather, functionality associated with one or more modules may be performed by separate hardware/software components or integrated within common hardware/software components.

The processing module 230-a of the ring 104 may include one or more processors (e.g., processing units), microcontrollers, digital signal processors, systems on a chip (SOCs), and/or other processing devices. The processing module 230-a communicates with the modules included in the ring 104. For example, the processing module 230-a may transmit/receive data to/from the modules and other components of the ring 104, such as the sensors. As described herein, the modules may be implemented by various circuit components. Accordingly, the modules may also be referred to as circuits (e.g., a communication circuit and power circuit).

The processing module 230-a may communicate with the memory 215. The memory 215 may include computer-readable instructions that, when executed by the processing module 230-a, cause the processing module 230-a to perform the various functions attributed to the processing module 230-a herein. In some implementations, the processing module 230-a (e.g., a microcontroller) may include additional features associated with other modules, such as communication functionality provided by the communication module 220-a (e.g., an integrated Bluetooth Low Energy transceiver) and/or additional onboard memory 215.

The communication module 220-a may include circuits that provide wireless and/or wired communication with the user device 106 (e.g., communication module 220-b of the user device 106). In some implementations, the communication modules 220-a, 220-b may include wireless communication circuits, such as Bluetooth circuits and/or Wi-Fi circuits. In some implementations, the communication modules 220-a, 220-b can include wired communication circuits, such as Universal Serial Bus (USB) communication circuits. Using the communication module 220-a, the ring 104 and the user device 106 may be configured to communicate with each other. The processing module 230-a of the ring may be configured to transmit/receive data to/from the user device 106 via the communication module 220-a. Example data may include, but is not limited to, motion data, temperature data, pulse waveforms, heart rate data, HRV data, PPG data, and status updates (e.g., charging status, battery charge level, and/or ring 104 configuration settings). The processing module 230-a of the ring may also be configured to receive updates (e.g., software/firmware updates) and data from the user device 106.

The ring 104 may include a battery 210 (e.g., a rechargeable battery 210). An example battery 210 may include a Lithium-Ion or Lithium-Polymer type battery 210, although a variety of battery 210 options are possible. The battery 210 may be wirelessly charged. In some implementations, the ring 104 may include a power source other than the battery 210, such as a capacitor. The power source (e.g., battery 210 or capacitor) may have a curved geometry that matches the curve of the ring 104. In some aspects, a charger or other power source may include additional sensors that may be used to collect data in addition to, or that supplements, data collected by the ring 104 itself. Moreover, a charger or other power source for the ring 104 may function as a user device 106, in which case the charger or other power source for the ring 104 may be configured to receive data from the ring 104, store and/or process data received from the ring 104, and communicate data between the ring 104 and the servers 110.

In some aspects, the ring 104 includes a power module 225 that may control charging of the battery 210. For example, the power module 225 may interface with an external wireless charger that charges the battery 210 when interfaced with the ring 104. The charger may include a datum structure that mates with a ring 104 datum structure to create a specified orientation with the ring 104 during charging. The power module 225 may also regulate voltage(s) of the device electronics, regulate power output to the device electronics, and monitor the state of charge of the battery 210. In some implementations, the battery 210 may include a protection circuit module (PCM) that protects the battery 210 from high current discharge, over voltage during charging, and under voltage during discharge. The power module 225 may also include electro-static discharge (ESD) protection.

The one or more temperature sensors 240 may be electrically coupled to the processing module 230-a. The temperature sensor 240 may be configured to generate a temperature signal (e.g., temperature data) that indicates a temperature read or sensed by the temperature sensor 240. The processing module 230-a may determine a temperature of the user in the location of the temperature sensor 240. For example, in the ring 104, temperature data generated by the temperature sensor 240 may indicate a temperature of a user at the user's finger (e.g., skin temperature). In some implementations, the temperature sensor 240 may contact the user's skin. In other implementations, a portion of the housing 205 (e.g., the inner housing 205-a) may form a barrier (e.g., a thin, thermally conductive barrier) between the temperature sensor 240 and the user's skin. In some implementations, portions of the ring 104 configured to contact the user's finger may have thermally conductive portions and thermally insulative portions. The thermally conductive portions may conduct heat from the user's finger to the temperature sensors 240. The thermally insulative portions may insulate portions of the ring 104 (e.g., the temperature sensor 240) from ambient temperature.

In some implementations, the temperature sensor 240 may generate a digital signal (e.g., temperature data) that the processing module 230-a may use to determine the temperature. As another example, in cases where the temperature sensor 240 includes a passive sensor, the processing module 230-a (or a temperature sensor 240 module) may measure a current/voltage generated by the temperature sensor 240 and determine the temperature based on the measured current/voltage. Example temperature sensors 240 may include a thermistor, such as a negative temperature coefficient (NTC) thermistor, or other types of sensors including resistors, transistors, diodes, and/or other electrical/electronic components.

The processing module 230-a may sample the user's temperature over time. For example, the processing module 230-a may sample the user's temperature according to a sampling rate. An example sampling rate may include one sample per second, although the processing module 230-a may be configured to sample the temperature signal at other sampling rates that are higher or lower than one sample per second. In some implementations, the processing module 230-a may sample the user's temperature continuously throughout the day and night. Sampling at a sufficient rate (e.g., one sample per second) throughout the day may provide sufficient temperature data for analysis described herein.

The processing module 230-a may store the sampled temperature data in memory 215. In some implementations, the processing module 230-a may process the sampled temperature data. For example, the processing module 230-a may determine average temperature values over a period of time. In one example, the processing module 230-a may determine an average temperature value each minute by summing all temperature values collected over the minute and dividing by the number of samples over the minute. In a specific example where the temperature is sampled at one sample per second, the average temperature may be a sum of all sampled temperatures for one minute divided by sixty seconds. The memory 215 may store the average temperature values over time. In some implementations, the memory 215 may store average temperatures (e.g., one per minute) instead of sampled temperatures in order to conserve memory 215.

The sampling rate, that may be stored in memory 215, may be configurable. In some implementations, the sampling rate may be the same throughout the day and night. In other implementations, the sampling rate may be changed throughout the day/night. In some implementations, the ring 104 may filter/reject temperature readings, such as large spikes in temperature that are not indicative of physiological changes (e.g., a temperature spike from a hot shower). In some implementations, the ring 104 may filter/reject temperature readings that may not be reliable due to other factors, such as excessive motion during exercise (e.g., as indicated by a motion sensor 245).

The ring 104 (e.g., communication module) may transmit the sampled and/or average temperature data to the user device 106 for storage and/or further processing. The user device 106 may transfer the sampled and/or average temperature data to the server 110 for storage and/or further processing.

Although the ring 104 is illustrated as including a single temperature sensor 240, the ring 104 may include multiple temperature sensors 240 in one or more locations, such as arranged along the inner housing 205-a near the user's finger. In some implementations, the temperature sensors 240 may be stand-alone temperature sensors 240. Additionally, or alternatively, one or more temperature sensors 240 may be included with other components (e.g., packaged with other components), such as with the accelerometer and/or processor.

The processing module 230-a may acquire and process data from multiple temperature sensors 240 in a similar manner described with respect to a single temperature sensor 240. For example, the processing module 230 may individually sample, average, and store temperature data from each of the multiple temperature sensors 240. In other examples, the processing module 230-a may sample the sensors at different rates and average/store different values for the different sensors. In some implementations, the processing module 230-a may be configured to determine a single temperature based on the average of two or more temperatures determined by two or more temperature sensors 240 in different locations on the finger.

The temperature sensors 240 on the ring 104 may acquire distal temperatures at the user's finger (e.g., any finger). For example, one or more temperature sensors 240 on the ring 104 may acquire a user's temperature from the underside of a finger or at a different location on the finger. In some implementations, the ring 104 may continuously acquire distal temperature (e.g., at a sampling rate). Although distal temperature measured by a ring 104 at the finger is described herein, other devices may measure temperature at the same/different locations. In some cases, the distal temperature measured at a user's finger may differ from the temperature measured at a user's wrist or other external body location. Additionally, the distal temperature measured at a user's finger (e.g., a "shell" temperature) may differ from the user's core temperature. As such, the ring 104 may provide a useful temperature signal that may not be acquired at other internal/external locations of the body. In some cases, continuous temperature measurement at the finger may capture temperature fluctuations (e.g., small or large fluctuations) that may not be evident in core temperature. For example, continuous temperature measurement at the finger may capture minute-to-minute or hour-to-hour temperature fluctuations that provide additional insight that may not be provided by other temperature measurements elsewhere in the body.

The ring 104 may include a PPG system 235. The PPG system 235 may include one or more optical transmitters that transmit light. The PPG system 235 may also include one or more optical receivers that receive light transmitted by the one or more optical transmitters. An optical receiver may generate a signal (hereinafter "PPG" signal) that indicates an amount of light received by the optical receiver. The optical transmitters may illuminate a region of the user's finger. The PPG signal generated by the PPG system 235 may indicate the perfusion of blood in the illuminated region. For example, the PPG signal may indicate blood volume changes in the illuminated region caused by a user's pulse pressure. The processing module 230-a may sample the PPG signal and determine a user's pulse waveform based on the PPG signal. The processing module 230-a may determine a variety of physiological parameters based on the user's pulse waveform, such as a user's respiratory rate, heart rate, HRV, oxygen saturation, and other circulatory parameters.

In some implementations, the PPG system 235 may be configured as a reflective PPG system 235 where the optical receiver(s) receive transmitted light that is reflected through the region of the user's finger. In some implementations, the PPG system 235 may be configured as a transmissive PPG system 235 where the optical transmitter(s) and optical receiver(s) are arranged opposite to one another, such that light is transmitted directly through a portion of the user's finger to the optical receiver(s).

The number and ratio of transmitters and receivers included in the PPG system 235 may vary. Example optical transmitters may include light-emitting diodes (LEDs). The optical transmitters may transmit light in the infrared spectrum and/or other spectrums. Example optical receivers may include, but are not limited to, photosensors, phototransistors, and photodiodes. The optical receivers may be configured to generate PPG signals in response to the wavelengths received from the optical transmitters. The location of the transmitters and receivers may vary. Additionally, a single device may include reflective and/or transmissive PPG systems 235.

The PPG system 235 illustrated in FIG. 2 may include a reflective PPG system 235 in some implementations. In these implementations, the PPG system 235 may include a centrally located optical receiver (e.g., at the bottom of the ring 104) and two optical transmitters located on each side of the optical receiver. In this implementation, the PPG system 235 (e.g., optical receiver) may generate the PPG signal based on light received from one or both of the optical transmitters. In other implementations, other placements, combinations, and/or configurations of one or more optical transmitters and/or optical receivers are contemplated.

The processing module 230-a may control one or both of the optical transmitters to transmit light while sampling the PPG signal generated by the optical receiver. In some implementations, the processing module 230-a may cause the optical transmitter with the stronger received signal to transmit light while sampling the PPG signal generated by the optical receiver. For example, the selected optical transmitter may continuously emit light while the PPG signal is sampled at a sampling rate (e.g., 250 Hz).

Sampling the PPG signal generated by the PPG system 235 may result in a pulse waveform that may be referred to as a "PPG." The pulse waveform may indicate blood pressure vs time for multiple cardiac cycles. The pulse waveform may include peaks that indicate cardiac cycles. Additionally, the pulse waveform may include respiratory induced variations that may be used to determine respiration rate. The processing module 230-a may store the pulse waveform in memory 215 in some implementations. The processing module 230-a may process the pulse waveform as it is generated and/or from memory 215 to determine user physiological parameters described herein.

The processing module 230-a may determine the user's heart rate based on the pulse waveform. For example, the processing module 230-a may determine heart rate (e.g., in beats per minute) based on the time between peaks in the pulse waveform. The time between peaks may be referred to as an interbeat interval (IBI). The processing module 230-a may store the determined heart rate values and IBI values in memory 215.

The processing module 230-a may determine HRV over time. For example, the processing module 230-a may determine HRV based on the variation in the IBIs. The processing module 230-a may store the HRV values over time in the memory 215. Moreover, the processing module 230-a may determine the user's respiratory rate over time. For example, the processing module 230-a may determine respiratory rate based on frequency modulation, amplitude modulation, or baseline modulation of the user's IBI values over a period of time. Respiratory rate may be calculated in breaths per minute or as another breathing rate (e.g., breaths per 30 seconds). The processing module 230-a may store user respiratory rate values over time in the memory 215.

The ring 104 may include one or more motion sensors 245, such as one or more accelerometers (e.g., 6-D accelerometers) and/or one or more gyroscopes (gyros). The motion sensors 245 may generate motion signals that indicate motion of the sensors. For example, the ring 104 may include one or more accelerometers that generate acceleration signals that indicate acceleration of the accelerometers. As another example, the ring 104 may include one or more gyro sensors that generate gyro signals that indicate angular motion (e.g., angular velocity) and/or changes in orientation. The motion sensors 245 may be included in one or more sensor packages. An example accelerometer/gyro sensor is a Bosch BMI160 inertial micro electro-mechanical system (MEMS) sensor that may measure angular rates and accelerations in three perpendicular axes.

The processing module 230-a may sample the motion signals at a sampling rate (e.g., 50 Hz) and determine the motion of the ring 104 based on the sampled motion signals. For example, the processing module 230-a may sample acceleration signals to determine acceleration of the ring 104. As another example, the processing module 230-a may sample a gyro signal to determine angular motion. In some implementations, the processing module 230-a may store motion data in memory 215. Motion data may include sampled motion data as well as motion data that is calculated based on the sampled motion signals (e.g., acceleration and angular values).

The ring 104 may store a variety of data described herein. For example, the ring 104 may store temperature data, such as raw sampled temperature data and calculated temperature data (e.g., average temperatures). As another example, the ring 104 may store PPG signal data, such as pulse waveforms and data calculated based on the pulse waveforms (e.g., heart rate values, IBI values, HRV values, and respiratory rate values). The ring 104 may also store motion data, such as sampled motion data that indicates linear and angular motion.

The ring 104, or other computing device, may calculate and store additional values based on the sampled/calculated physiological data. For example, the processing module 230 may calculate and store various metrics, such as sleep metrics (e.g., a Sleep Score), activity metrics, and readiness metrics. In some implementations, additional values/metrics may be referred to as "derived values." The ring 104, or other computing/wearable device, may calculate a variety of values/metrics with respect to motion. Example derived values for motion data may include, but are not limited to, motion count values, regularity values, intensity values, metabolic equivalence of task values (METs), and orientation values. Motion counts, regularity values, intensity values, and METs may indicate an amount of user motion (e.g., velocity/acceleration) over time. Orientation values may indicate how the ring 104 is oriented on the user's finger and if the ring 104 is worn on the left hand or right hand.

In some implementations, motion counts and regularity values may be determined by counting a number of acceleration peaks within one or more periods of time (e.g., one or more 30 second to 1 minute periods). Intensity values may indicate a number of movements and the associated intensity (e.g., acceleration values) of the movements. The intensity values may be categorized as low, medium, and high, depending on associated threshold acceleration values. METs may be determined based on the intensity of movements during a period of time (e.g., 30 seconds), the regularity/irregularity of the movements, and the number of movements associated with the different intensities.

In some implementations, the processing module 230-a may compress the data stored in memory 215. For example, the processing module 230-a may delete sampled data after making calculations based on the sampled data. As another example, the processing module 230-a may average data over longer periods of time in order to reduce the number of stored values. In a specific example, if average temperatures for a user over one minute are stored in memory 215, the processing module 230-a may calculate average temperatures over a five minute time period for storage, and then subsequently erase the one minute average temperature data. The processing module 230-a may compress data based on a variety of factors, such as the total amount of used/available memory 215 and/or an elapsed time since the ring 104 last transmitted the data to the user device 106.

Although a user's physiological parameters may be measured by sensors included on a ring 104, other devices may measure a user's physiological parameters. For example, although a user's temperature may be measured by a temperature sensor 240 included in a ring 104, other devices may measure a user's temperature. In some examples, other wearable devices (e.g., wrist devices) may include sensors that measure user physiological parameters. Additionally, medical devices, such as external medical devices (e.g., wearable medical devices) and/or implantable medical devices, may measure a user's physiological parameters. One or more sensors on any type of computing device may be used to implement the techniques described herein.

The physiological measurements may be taken continuously throughout the day and/or night. In some implementations, the physiological measurements may be taken during portions of the day and/or portions of the night. In some implementations, the physiological measurements may be taken in response to determining that the user is in a specific state, such as an active state, resting state, and/or a sleeping state. For example, the ring 104 can make physiological measurements in a resting/sleep state in order to acquire cleaner physiological signals. In one example, the ring 104 or other device/system may detect when a user is resting and/or sleeping and acquire physiological parameters (e.g., temperature) for that detected state. The devices/systems may use the resting/sleep physiological data and/or other data when the user is in other states in order to implement the techniques of the present disclosure.

In some implementations, as described previously herein, the ring 104 may be configured to collect, store, and/or process data, and may transfer any of the data described herein to the user device 106 for storage and/or processing. In some aspects, the user device 106 includes a wearable application 250, an operating system 285 (OS), a web browser application (e.g., web browser 280), one or more additional applications, and a GUI 275. The user device 106 may further include other modules and components, including sensors, audio devices, haptic feedback devices, and the like. The wearable application 250 may include an example of an application (e.g., "app") that may be installed on the user device 106. The wearable application 250 may be configured to acquire data from the ring 104, store the acquired data, and process the acquired data as described herein. For example, the wearable application 250 may include a user interface (UI) module 255, an acquisition module 260, a processing module 230-b, a communication module 220-b, and a storage module (e.g., database 265) configured to store application data.

The various data processing operations described herein may be performed by the ring 104, the user device 106, the servers 110, or any combination thereof. For example, in some cases, data collected by the ring 104 may be pre-processed and transmitted to the user device 106. In this example, the user device 106 may perform some data processing operations on the received data, may transmit the data to the servers 110 for data processing, or both. For instance, in some cases, the user device 106 may perform processing operations that require relatively low processing power and/or operations that require a relatively low latency, whereas the user device 106 may transmit the data to the servers 110 for processing operations that require relatively high processing power and/or operations that may allow relatively higher latency.

In some aspects, the ring 104, user device 106, and server 110 of the system 200 may be configured to evaluate sleep patterns for a user. In particular, the respective components of the system 200 may be used to collect data from a user via the ring 104, and generate one or more scores (e.g., Sleep Score, Readiness Score) for the user based on the collected data. For example, as noted previously herein, the ring 104 of the system 200 may be worn by a user to collect data from the user, including temperature, heart rate, HRV, and the like. Data collected by the ring 104 may be used to determine when the user is asleep in order to evaluate the user's sleep for a given "sleep day." In some aspects, scores may be calculated for the user for each respective sleep day, such that a first sleep day is associated with a first set of scores, and a second sleep day is associated with a second set of scores. Scores may be calculated for each respective sleep day based on data collected by the ring 104 during the respective sleep day. Scores may include, but are not limited to, Sleep Scores, Readiness Scores, and the like.

In some cases, "sleep days" may align with the traditional calendar days, such that a given sleep day runs from midnight to midnight of the respective calendar day. In other cases, sleep days may be offset relative to calendar days. For example, sleep days may run from 6:00 pm (18:00) of a calendar day until 6:00 pm (18:00) of the subsequent calendar day. In this example, 6:00 pm may serve as a "cut-off time," where data collected from the user before 6:00 pm is counted for the current sleep day, and data collected from the user after 6:00 pm is counted for the subsequent sleep day. Due to the fact that most individuals sleep the most at night, offsetting sleep days relative to calendar days may enable the system 200 to evaluate sleep patterns for users in such a manner that is consistent with their sleep schedules. In some cases, users may be able to selectively adjust (e.g., via the GUI) a timing of sleep days relative to calendar days so that the sleep days are aligned with the duration of time that the respective users typically sleep.

In some implementations, each overall score for a user for each respective day (e.g., Sleep Score, Readiness Score) may be determined/calculated based on one or more "contributors," "factors," or "contributing factors." For example, a user's overall Sleep Score may be calculated based on a set of contributors, including: total sleep, efficiency, restfulness, REM sleep, deep sleep, latency, timing, or any combination thereof. The Sleep Score may include any quantity of contributors. The "total sleep" contributor may refer to the sum of all sleep periods of the sleep day. The "efficiency" contributor may reflect the percentage of time spent asleep compared to time spent awake while in bed, and may be calculated using the efficiency average of long sleep periods (e.g., primary sleep period) of the sleep day, weighted by a duration of each sleep period. The "restfulness" contributor may indicate how restful the user's sleep is, and may be calculated using the average of all sleep periods of the sleep day, weighted by a duration of each period. The restfulness contributor may be based on a "wake up count" (e.g., sum of all the wake-ups (when user wakes up) detected during different sleep periods), excessive movement, and a "got up count" (e.g., sum of all the got-ups (when user gets out of bed) detected during the different sleep periods).

The "REM sleep" contributor may refer to a sum total of REM sleep durations across all sleep periods of the sleep day including REM sleep. Similarly, the "deep sleep" contributor may refer to a sum total of deep sleep durations across all sleep periods of the sleep day including deep sleep. The "latency" contributor may signify how long (e.g., average, median, longest) the user takes to go to sleep, and may be calculated using the average of long sleep periods throughout the sleep day, weighted by a duration of each period and the number of such periods (e.g., consolidation of a given sleep stage or sleep stages may be its own contributor or weight other contributors). Lastly, the "timing" contributor may refer to a relative timing of sleep periods within the sleep day and/or calendar day, and may be calculated using the average of all sleep periods of the sleep day, weighted by a duration of each period.

By way of another example, a user's overall Readiness Score may be calculated based on a set of contributors, including: sleep, sleep balance, heart rate, HRV balance, recovery index, temperature, activity, activity balance, or any combination thereof. The Readiness Score may include any quantity of contributors. The "sleep" contributor may refer to the combined Sleep Score of all sleep periods within the sleep day. The "sleep balance" contributor may refer to a cumulative duration of all sleep periods within the sleep day. In particular, sleep balance may indicate to a user whether the sleep that the user has been getting over some duration of time (e.g., the past two weeks) is in balance with the user's needs. Typically, adults need 7-9 hours of sleep a night to stay healthy, alert, and to perform at their best both mentally and physically. However, it is normal to have an occasional night of bad sleep, so the sleep balance contributor takes into account long-term sleep patterns to determine whether each user's sleep needs are being met. The "resting heart rate" contributor may indicate a lowest heart rate from the longest sleep period of the sleep day (e.g., primary sleep period) and/or the lowest heart rate from naps occurring after the primary sleep period.

Continuing with reference to the "contributors" (e.g., factors, contributing factors) of the Readiness Score, the "HRV balance" contributor may indicate a highest HRV average from the primary sleep period and the naps happening after the primary sleep period. The HRV balance contributor may help users keep track of their recovery status by comparing their HRV trend over a first time period (e.g., two weeks) to an average HRV over some second, longer time period (e.g., three months). The "recovery index" contributor may be calculated based on the longest sleep period. Recovery index measures how long it takes for a user's resting heart rate to stabilize during the night. A sign of a very good recovery is that the user's resting heart rate stabilizes during the first half of the night, at least six hours before the user wakes up, leaving the body time to recover for the next day. The "body temperature" contributor may be calculated based on the longest sleep period (e.g., primary sleep period) or based on a nap happening after the longest sleep period if the user's highest temperature during the nap is at least 0.5° C. higher than the highest temperature during the longest period. In some aspects, the ring may measure a user's body temperature while the user is asleep, and the system 200 may display the user's average temperature relative to the user's baseline temperature. If a user's body temperature is outside of their normal range (e.g., clearly above or below 0.0), the body temperature contributor may be highlighted (e.g., go to a "Pay attention" state) or otherwise generate an alert for the user.

In some aspects, the system 200 may support a manufacturing process (e.g., and system) that reduces manufacturing complexities and deformities. For example, as described previously, the ring 104 may include an inner housing 205-$a$ (e.g., inner housing member) and an outer housing 205-$b$ (e.g., outer housing member), where the inner housing 205-$a$ includes one or more cutouts. In such cases, a cavity may exist between the inner housing 205-$a$ and the outer housing 205-$b$, where one or more sensors, such as a PPG system 235, one or more temperature sensors 240, one or more motion sensors 245, or any combination thereof, are positioned in the cavity with reference to the one or more cutouts (e.g., aligned with the one or more cutouts). In such cases, a manufacturing process may include, at least, a molding process to enable a fillable material (e.g., polymer) to be injected (e.g., injection molded) into the cavity of the ring 104, securing the one or more sensors in place, without producing manufacturing deformities at the one or more cutouts.

For example, a manufacturing system (e.g., including at least a stretching system and an injection system) may position a deformable band (e.g., loop) through an inner circumference of the inner housing 205-$a$ of the ring 104. The manufacturing system (e.g., the stretching system) may stretch the deformable band to create tension across at least a portion of the inner housing, the tension including at least axial tension across the one or more cutouts in the inner housing 205-$a$. Accordingly, the manufacturing system (e.g., the injection system) may inject the fillable material through an opening in the ring 104 (e.g., through an opening in the outer housing 205-$b$), such that the fillable material may fill the cavity between the inner housing 205-$a$ and the outer housing 205-$b$. Additionally, the fillable material may fill the one or more cutouts and contact the deformable band, securing the one or more sensors in place, without further deforming the deformable band.

Figure 3:
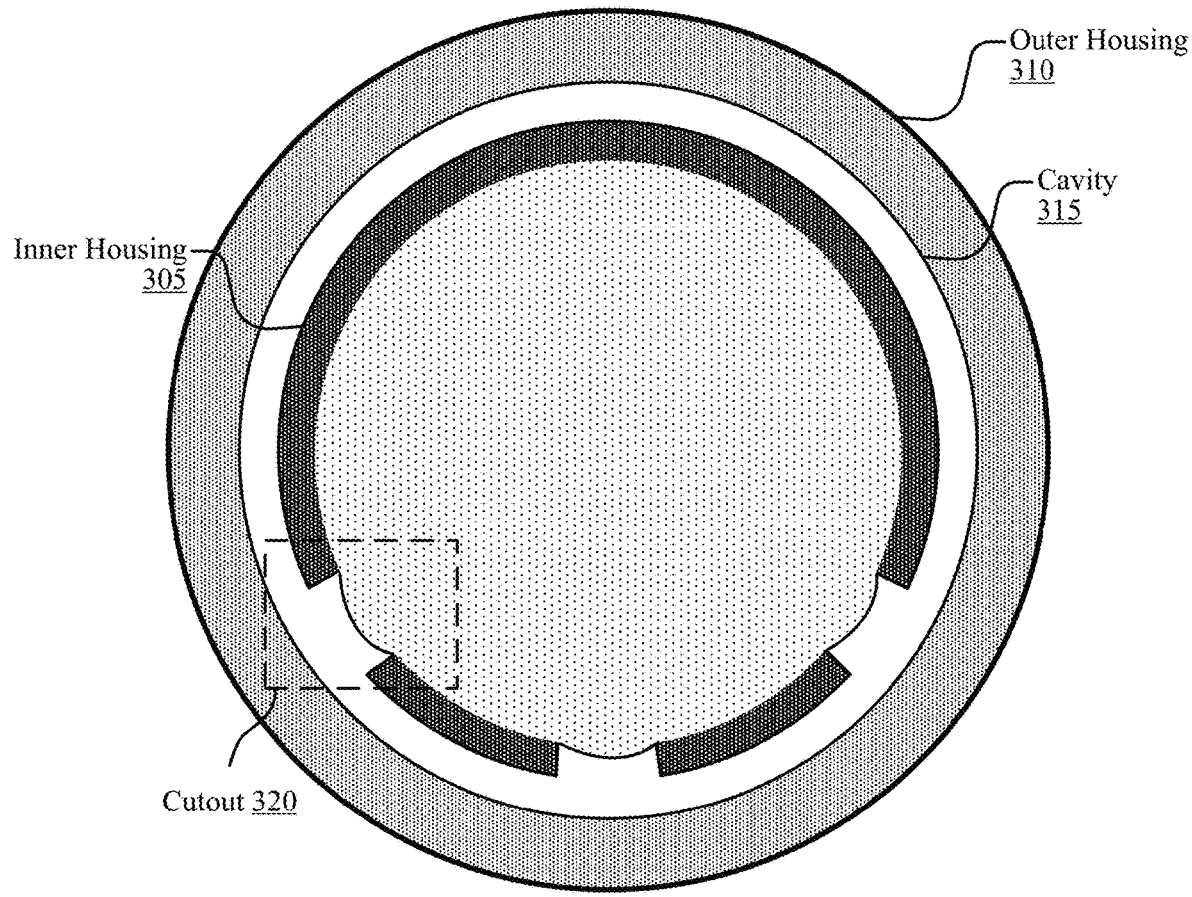
FIG. 3 illustrates an example of a manufacturing system that supports a loop mold for wearable device manufacturing in accordance with aspects of the present disclosure.
Figure 3:
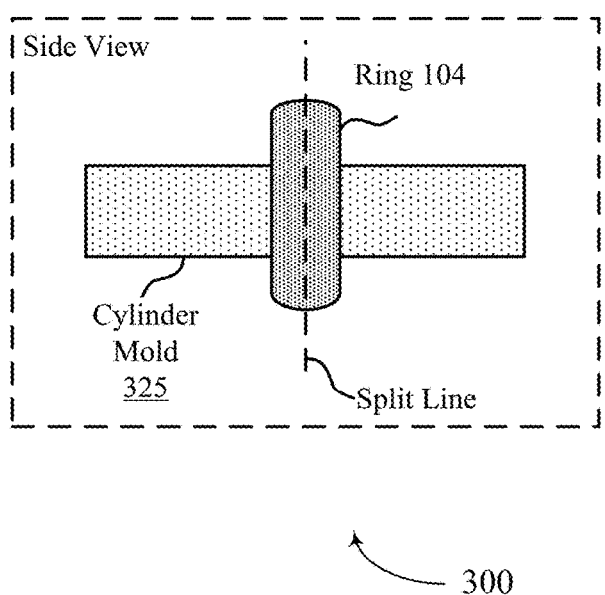

FIG. 3 illustrates an example of a manufacturing system 300 that supports a manufacturing process that reduces manufacturing complexities and deformities in accordance with aspects of the present disclosure. The manufacturing system 300 may implement, or be implemented by, the system 100 and the system 200. In particular, the manufacturing system 300 illustrates a manufacturing process to manufacture a ring 104, as described with reference to FIGS. 1 and 2.

A user may use a device, for example, a ring 104 to collect, monitor, and track physiological data of the user based on measurements collected via one or more sensors of the ring 104 collected, as described with reference to FIG. 2. In some cases, the ring 104 may include an inner housing 305 and an outer housing 310, such that a cavity 315 is created between the inner housing 305 and the outer housing 310. Additionally, one or more sensors may be positioned (e.g., located) between the inner housing 305 and the outer housing 310 (e.g., in the cavity 315). In such cases, a fillable material (e.g., polymer, epoxy, etc.) may be injected (e.g., injection molded) between the inner housing 305 and the outer housing 310 to fill the cavity 315 (e.g., space in the cavity 315 not occupied by the one or more sensors) such that the one or more sensors are secured (e.g., fixed) in their position. However, in some cases, the inner housing 305 may include one or more cutouts 320 to enable the one or more sensors access to skin of a user wearing the ring 104 and the one or more cutouts 320 may allow the fillable material to leak outside of the inner housing 305.

As such, a cylinder mold 325 (e.g., silicon cylinder mold 325) may be placed within an inner circumference of the inner housing 305, such that the cylinder mold 325 presses against the inner housing of the wearable ring device to seal the one or more cutouts 320 (e.g., the cylinder mold 325 may be slightly bigger in diameter than the inner housing 305). That is, the cylinder mold 325 may press against the inner housing 305 in a radial direction (e.g., the direction of force applied by the cylinder mold 325 is radial, in the radial direction), creating a radial force to seal (e.g., close) the one or more cutouts 320. However, in some cases, the radial force created by the cylinder mold 325 may exceed a first threshold (e.g., the cylinder mold 325 is too tight), such that the cylinder mold 325 may push (e.g., extend) into the one or more cutouts 320, creating a bump effect (e.g., protrusion) into the one or more cutouts 320. That is, the cylinder mold 325 may protrude into the one or more cutouts 320. In such cases, the fillable material may not fill the entirety of the one or more cutouts 320 during injection, resulting in manufacturing deformities (e.g., air gaps may exist between the fillable material in the one or more cutouts 320 and skin of a user 102 while the ring 104 is worn). That is, upon removal of the cylinder mold 325, the fillable material in the one or more cutouts 320 may not be flush with the inner circumference of the inner housing 305 that may impact the accuracy of physiological data collected via the one or more sensors. Alternatively, the radial force created by the cylinder mold 325 may fail to exceed a second threshold (e.g., the cylinder mold 325 is too loose) such that the cylinder mold 325 may not create a seal with the one or more cutouts 320. In other words, the fillable material may leak outside of the inner housing 305 (e.g., through space between the cylinder mold 325 and the one or more cutouts 320) of the ring 104 during injection, resulting in manufacturing deformities that may require additional manufacturing to remove (e.g., correct) or may impact the accuracy of physiological data collected via the one or more sensors if not removed.

Additionally, or alternatively, the inner housing 305 of the ring 104 may be asymmetrical such that the cylinder mold 325 may also be asymmetrical (e.g., to mirror the asymmetries of the inner housing 305). In such cases, the cylinder mold 325 may need to be positioned within the inner housing 305 of the ring 104 such that the asymmetries of the inner housing 305 align with the asymmetries of the cylinder mold 325, resulting in manufacturing complexities or, if misaligned, manufacturing deformities. Further, a size of the cylinder mold 325 may depend on a size of the ring 104, resulting in additional manufacturing complexities and costs.

Accordingly, the manufacturing system 300 may support a manufacturing process that reduces manufacturing complexities and deformities. For example, as described previously, the ring 104 may include an inner housing 305 (e.g., inner housing member) and an outer housing 310 (e.g., outer housing member), where the inner housing 305 includes one or more cutouts 320. In such cases, a cavity 315 may exist between the inner housing 305 and the outer housing 310, where one or more sensors, such as a PPG system, one or more temperature sensors, one or more motion sensors, or any combination thereof, are positioned with reference to the one or more cutouts 320 (e.g., aligned with the one or more cutouts 320), as described with reference to FIG. 2. In such cases, the manufacturing system 300 may enable a fillable material (e.g., polymer) to be injected (e.g., injection molded) into the cavity 315 of the ring 104, securing the one or more sensors in place, without producing manufacturing deformities at the one or more cutouts.

For example, the manufacturing system 300 may include, at least, a stretching system and an injection system. The stretching system may position a deformable band (e.g., loop) through the inner circumference of the inner housing 305 of the ring 104. The stretching system may stretch the deformable band to create tension across at least a portion of the inner housing 305, the tension including at least axial tension across the one or more cutouts 320 in the inner housing 305. Accordingly, the injection system may inject the fillable material through an opening in the ring 104 (e.g., through an opening in the outer housing 310), such that the fillable material may fill the cavity 315 between the inner housing 305 and the outer housing 310. Additionally, the fillable material may fill the one or more cutouts 320 and contact the deformable band, securing the one or more sensors in place, without further deforming the deformable band, as described further with reference to FIG. 4.

Figure 4A:
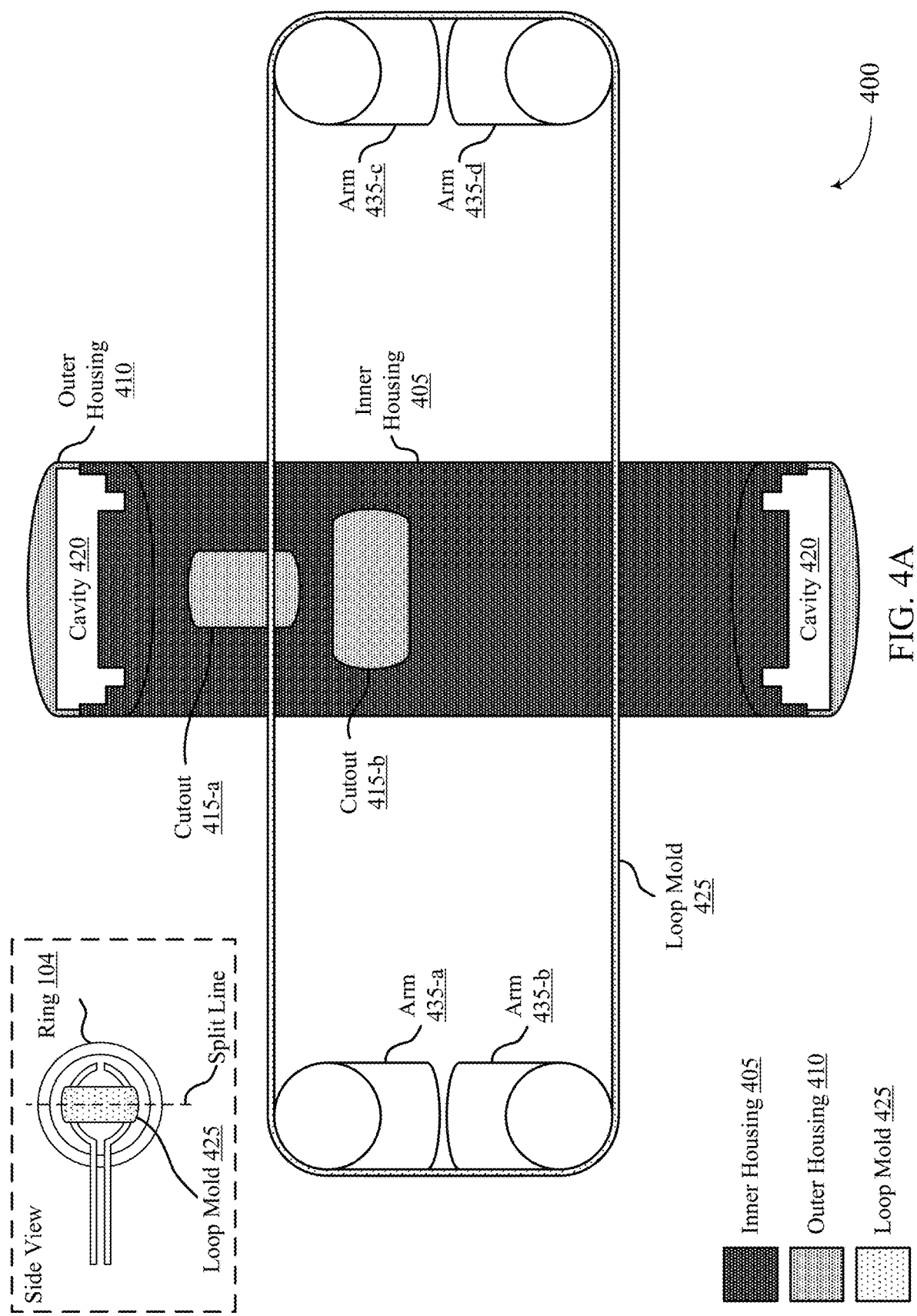
FIGS. 4A and 4B illustrate an example of a manufacturing system that supports a loop mold for wearable device manufacturing in accordance with aspects of the present disclosure.
Figure 4B:
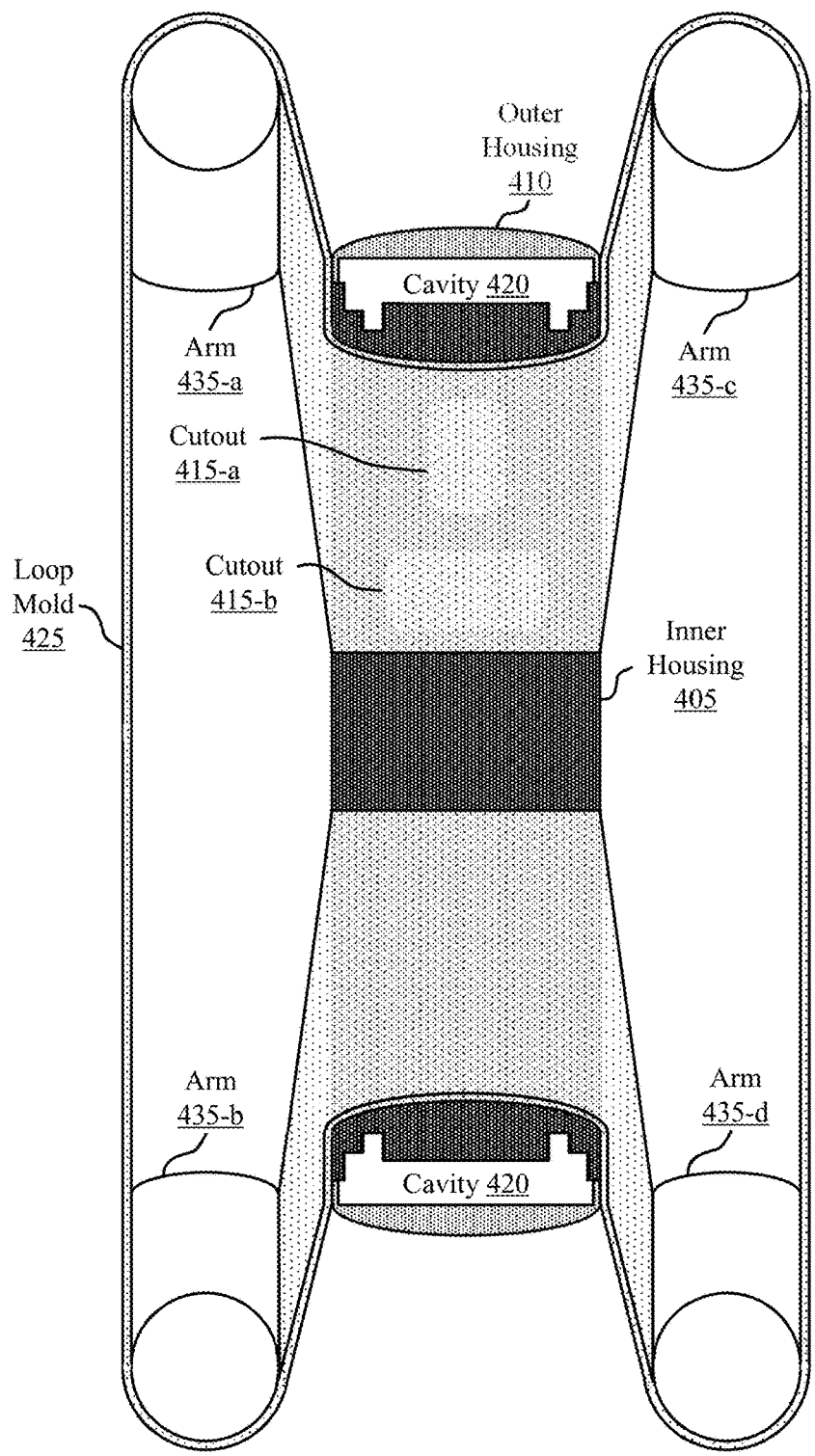

FIGS. 4A and 4B illustrate an example of a manufacturing system 400 that supports a manufacturing process that reduces manufacturing complexities and deformities in accordance with aspects of the present disclosure. The manufacturing system 400 may implement, or be implemented by, the system 100, the system 200, and the manufacturing system 300. In particular, the manufacturing system 400 illustrates a manufacturing process to manufacture a ring 104, as described with reference to FIGS. 1 and 2.

The manufacturing system 400 may support a manufacturing process that reduces manufacturing complexities and deformities. As described previously, with reference to FIG. 3, a ring 104 may include an inner housing 405 (e.g., inner wall, inlet wall) and an outer housing 410 (e.g., outer wall, outlet wall), where the inner housing 405 includes one or more cutouts 415, such as a cutout 415-*a* and a cutout 415-*b*. In such cases, a cavity 420 may exist between the inner housing 405 and the outer housing 410, and one or more sensors may be positioned within the cavity 420. In particular, the one or more sensors may be positioned within the cavity 420 with reference to the cutouts 415. For example, the one or more sensors may be positioned so that the one or more sensors align with the cutouts 415, such that the one or more sensors may access (e.g., may be in contact with) skin of a user 102 wearing the ring 104. In other words, the one or more sensors may transmit one or more outputs via (e.g., through) the cutouts 415, receive one or more inputs via the cutouts 415, or both.

In some examples (e.g., in a first part of the manufacturing process), a loop mold 425, that may also be referred to as a deformable band, may be positioned (e.g., by the manufacturing system 300) within an inner circumference of the inner housing 405, as described with reference to FIG. 4A. That is, the loop mold 425 may be positioned within the inner circumference of the inner housing 405 such that a first end of the loop mold 425 extends on (e.g., past) a first side of the ring 104 and a second end of the loop mold 425 extends on a second side of the ring 104. In some cases, the loop mold 425 may bisect a cross section of the ring 104. Additionally, or alternatively, the loop mold 425 may be positioned such that a width (e.g., thickness) of the loop mold 425 is aligned with the cutouts 415.

Additionally, the manufacturing system 400 may include a stretching system that includes multiple arms 435 that are grouped into multiple sets of arms, such as a first set of arms 435 including an arm 435-*a* and an arm 435-*b* and a second set of arms 435 including an arm 435-*c* and an arm 435-*d*. Each arm 435 may include a straight portion of the arm 435 followed by a curved portion of the arm 435, where a curve of the curved portion of the arm 435 is based on a size of the ring 104. That is, the curve of the curved portion of the arm 435 may mirror (e.g., according to a ratio) a curve of the ring 104. For example, a first stretching system may include arms 435 associated with a first curve (e.g., radius or diameter) that may support a first set of rings 104 sizes and a second stretching system may be associated with a second curve that may support a second set of ring 104 sizes. Though described in the context of two stretching systems, this is not to be regarded as a limitation of the present disclosure. That is any quantity of stretching systems may support any quantity of ring 104 sizes, as described with reference to the techniques described herein.

Accordingly, a curved portion of the arm 435 may align with the curve of the ring 104. For example, the arm 435-*a* may be positioned such that a curve of the arm 435-*a* aligns with a top portion of the ring 104 and the arm 435-*b* may be positioned such that a curve of the arm 435-*b* aligns with a bottom portion of the ring 104. That is, the arm 435-*a* may be positioned above the arm 435-*b*, such that the arm 435-*a* and the arm 435-*b* (e.g., the first set of arms 435) form a circular (e.g., spherical) orientation. In other words, an orientation of the arm 435-*a* may mirror an orientation of the arm 435-*b*. The second set of arms 435, including the arm 435-*c* and the arm 435-*d*, may be positioned in a similar manner with reference to each other (e.g., and with reference to the ring 104). Additionally, or alternatively, the orientation of the arm 435-*a* may mirror an orientation of the arm 435-*c* and the orientation of the arm 435-*b* may mirror an orientation of the arm 435-*d*.

Additionally, the arms 435 may be positioned within the loop mold 425. That is, the first set of arms 435, including the arm 435-*a* and the arm 435-*b*, may be positioned within an inner circumference of the loop mold 425, at the first end of the loop mold 425 (e.g., that extends past the first side of the ring 104) and the second set of arms 435, including the arm 435-*c* and the arm 435-*d*, may be positioned with the inner circumference of the loop mold 425, at the second end of the loop mold 425 (e.g., that extends past the second side of the ring 104). In other words, the first set of arms 435 may be positioned at an opposite end of the loop mold 425 compared to the second set of arms 435.

As such (e.g., during a second part of the manufacturing process), one or more components of the stretching system may move to apply a force to the loop mold 425 to stretch the loop mold 425, as described with reference to FIG. 4B. That is, each arm 435 may move in a lateral direction (e.g., +/−x direction, left or right direction), a vertical direction (e.g., +/−y direction, up or down direction), a longitudinal direction (e.g., +/−z direction, forward or backward direction), or any combination thereof, as compared to a start position of each arm 435, to apply the force to the loop mold 425. In some examples, movement of an arm 435 in more than one direction may be described in the context of an angular direction as compared to a starting position of the arm 435 (e.g., starting direction vector associated with the arm 435). For example, the arm 435-*a* and the arm 435-*c* may move in a first vertical direction (e.g., upward) and the arm 435-*b* and the arm 435-*d* may move in a second vertical direction (e.g., downward). That is, the arm 435-*a* may move in a same vertical direction as the arm 435-*c* and the arm 435-*b* (e.g., an upward direction, +y direction) may move in a same vertical direction as the arm 435-*d* (e.g., in a downward direction, −y direction). Conversely, the arm 435-*a* may move in a vertical direction (e.g., upward) opposite vertical movement of the arm 435-*b* (e.g., downward) and the arm 435-*c* may move in a vertical direction (e.g., upward) opposite vertical movement of the arm 435-*d* (e.g., downward).

Additionally, or alternatively, the arm 435-*a* and the arm 435-*b* (e.g., the first set of arms 435) may move in a first lateral direction (e.g., towards the ring 104) and the arm 435-*c* and the arm 435-*d* (e.g., the second set of arms 435) may move in a second lateral direction (e.g., also towards the ring 104). That is, the arm 435-*a* and the arm 435-*b* may move in a same lateral direction and the arm 435-*c* and the arm 435-*d* may move in a same lateral direction. Conversely, the arm 435-*a* and the arm 435-*b* may move in an opposite lateral direction as the arm 435-*c* and the arm 435-*d*. Though described in the context of same directions (e.g., lateral or vertical) and opposite directions, this is not to be regarded as a limitation of the present disclosure. That is, each arm 435 (e.g., or set of arms 435) may move in a lateral direction, a vertical direction, longitudinal direction, or any combination thereof, that may be the same as or different than another arm 435. In other words, each arm 435 (e.g., or set of arms 435) may move in any direction that may be the same as or different than another arm 435 (e.g., or another set of arms 435)

Accordingly, the loop mold 425 may stretch based on the movement of the arms 435 (e.g., based on the force created by movement of the arms 435), such that tension is created in the loop mold 425 contacting at least a portion of the inner housing 405. That is, the loop mold 425 may be stretched (e.g., by the stretching system) such that axial tension (e.g., at least) is created in the loop mold 425 across the cutouts 415, sealing the one or more cutouts. In other words, the loop mold 425 may be stretch such that a combination of radial tension (e.g., resulting in a force applied to the ring 104) and axial tension (e.g., resulting in no force being applied to the ring 104) is created in the loop mold 425 contacting (e.g., at) the edges of the ring 104, resulting in axial tension being created in the loop mold 425 contacting (e.g., across) the middle (e.g., width) of the ring 104, including the cutouts 415. In some examples, the loop mold 425 may be stretched such that the loop mold 425 changes shape based on the force created by the stretching system, however, due to the material (e.g., flexible material) of the loop mold 425, the loop mold 425 may return to an original (e.g., initial, unchanged shape) after release of the force. As such, an injection system (e.g., of the manufacturing system 400) may inject a fillable material through an opening in the ring 104 (e.g., through an opening in the outer housing 410 of the ring 104 or an opening in the inner housing 405 of the ring 104) to fill the cavity 420 and secure the one or more sensors in place. Additionally, the fillable material may fill the cutouts 415 and contact the loop mold 425, without further deforming the loop mold 425 (e.g., without creating manufacturing defects). In other words, a force (e.g., pressure) applied to the loop mold 425 by the fillable material (e.g., at the cutouts 415) during injection may be less than a force threshold associated with deforming (e.g., required force to deform) the loop mold 425, where the force threshold is based on the tension created in the loop mold 425 due to stretching. That is, the fillable material may fill the cutouts 415 such that the fillable material is flush with a surface (e.g., an outer surface) of the inner housing 405.

In some examples, the stretching system may stretch the loop mold 425 according to one or more tension thresholds. That is, one or more components of the stretching system, such as the arms 435, may move such that a force is applied to the loop mold 425 to create the tension in the loop mold 425 that contacts at least a portion of the inner circumference of the inner housing 405, where the tension is based on the one or more tension thresholds. For example, the tension may be greater than a first tension threshold but less than a second tension threshold. Additionally, or alternatively, the tension may be within a range of the first tension threshold, the second tension threshold, or both. In some examples, one or more tension threshold may be associated with axial tension and one or more tension threshold may be associated with radial tension. Additionally, or alternatively, the one or more tension threshold may be based on a speed at which the fillable material is injected, a pressure associated with injecting the fillable material, one or more pressure threshold associated with injecting the fillable material, a material of the loop mold 425, the fillable material, a size of the ring 104, a size of the cutouts 415, a quantity of the cutouts 415, or any combination thereof.

Additionally, or alternatively, the injection system may inject the fillable material according to one or more pressure thresholds (e.g., force thresholds). For example, a pressure generated within one or more portions of the cavity 420 may be greater than a first pressure threshold but less than a second pressure threshold. Additionally, or alternatively, the generated pressure may be within a range of the first pressure threshold, the second pressure threshold, or both. Additionally, or alternatively, the one or more pressure thresholds may be based on the speed at which the fillable material is injected, the material of the loop mold 425, the fillable material, the size of the ring 104, the size of the cutouts 415, a quantity of the cutouts 415, the axial tension across the cutouts 415, the one or more tension threshold associated with stretching the loop mold 425, or any combination thereof.

In other words, the loop mold 425 may be stretched according to one or more tension threshold and the fillable material may be injected according to one or more pressure thresholds, such that a pressure (e.g., force) created at the cutouts 415 by injection of the fillable material is within a threshold (e.g., equals) the tension (e.g., force) created in the loop mold 425 at the cutouts 415. That is, a force (e.g., pressure) applied to the loop mold 425 by the fillable material at the cutouts 415 during injection may be less than a force threshold (e.g., pressure threshold) associated with deforming the loop mold 425, where the force threshold is based on the tension created in the loop mold 425 due to stretching and the tension created in the loop mold 425 due to stretching may be based on a tension threshold. In such cases, balancing of the pressure and the tension may enable the injection system to fill the cutouts 415 with fillable material without further deforming the deformable band.

Figure 5:
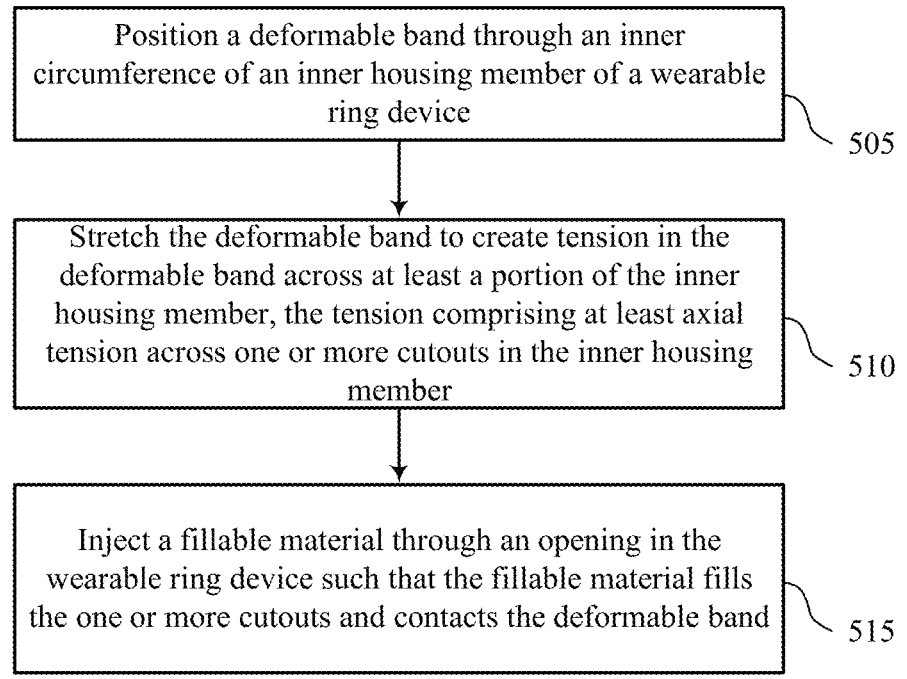
FIGS. 5 and 6 illustrate flowcharts showing methods that support a loop mold for wearable device manufacturing in accordance with aspects of the present disclosure.

FIG. 5 illustrates a flowchart showing a method 500 that supports a manufacturing process that reduces manufacturing complexities and deformities in accordance with aspects of the present disclosure. The operations of the method 500 may be implemented by a user device or its components as described herein. For example, the operations of the method 500 may be performed by a user device as described with reference to FIGS. 1 through 4. In some examples, a user device may execute a set of instructions to control the functional elements of the user device to perform the described functions. Additionally, or alternatively, the user device may perform aspects of the described functions using special-purpose hardware.

At 505, the method may include positioning a deformable band through an inner circumference of an inner housing member of a wearable ring device. The operations of 505 may be performed in accordance with examples as disclosed herein.

At 510, the method may include stretching the deformable band to create tension in the deformable band across at least a portion of the inner housing member, the tension comprising at least axial tension across one or more cutouts in the inner housing member. The operations of 510 may be performed in accordance with examples as disclosed herein.

At 515, the method may include injecting a fillable material through an opening in the wearable ring device such that the fillable material fills the one or more cutouts and contacts the deformable band. The operations of 515 may be performed in accordance with examples as disclosed herein.

Figure 6:
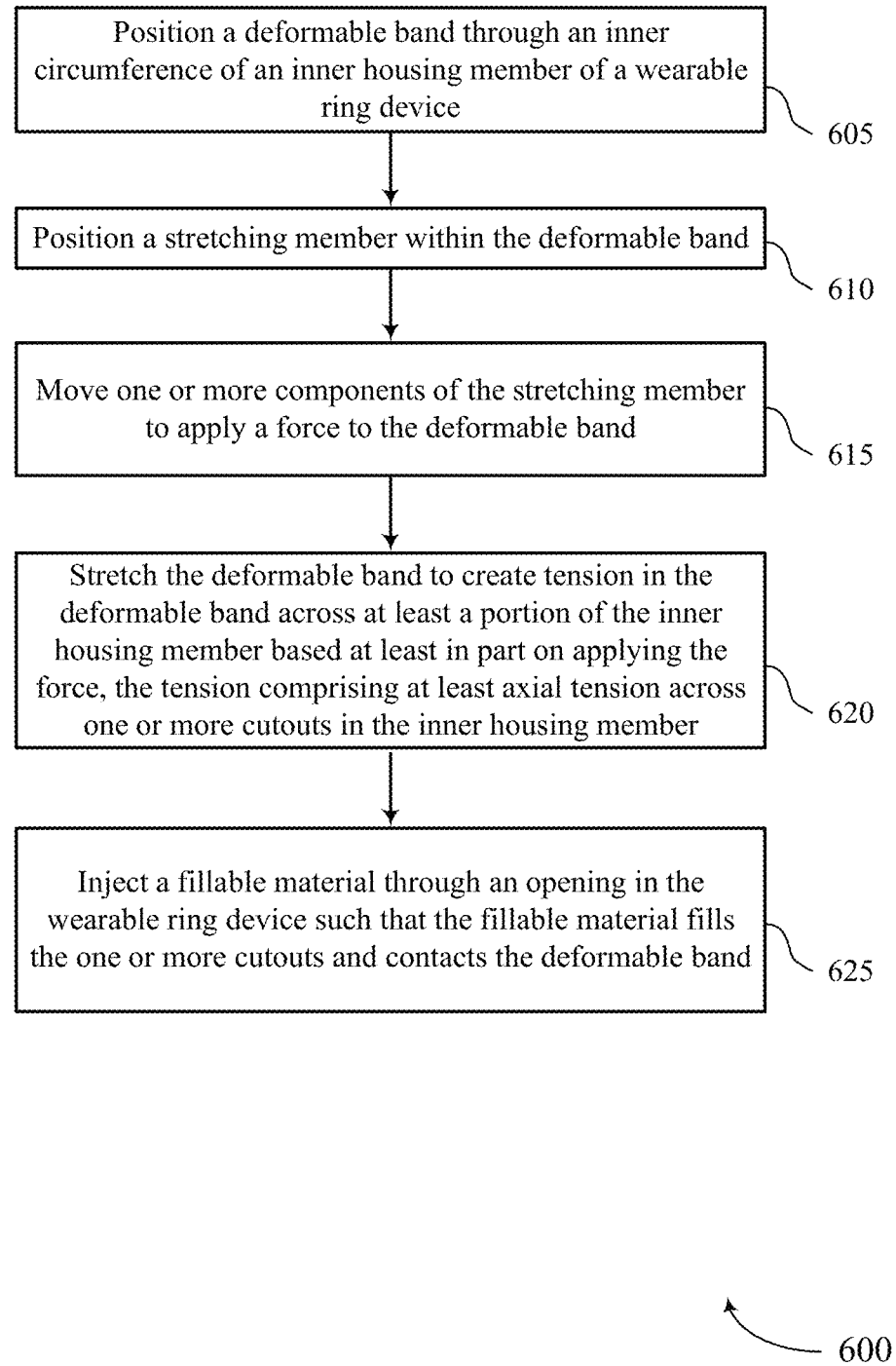

FIG. 6 illustrates a flowchart showing a method 600 that supports a manufacturing process that reduces manufacturing complexities and deformities in accordance with aspects of the present disclosure. The operations of the method 600 may be implemented by a user device or its components as described herein. For example, the operations of the method 600 may be performed by a user device as described with reference to FIGS. 1 through 4. In some examples, a user device may execute a set of instructions to control the functional elements of the user device to perform the described functions. Additionally, or alternatively, the user device may perform aspects of the described functions using special-purpose hardware.

At 605, the method may include positioning a deformable band through an inner circumference of an inner housing member of a wearable ring device. The operations of 605 may be performed in accordance with examples as disclosed herein.

At 610, the method may include position a stretching member within the deformable band. The operations of 610 may be performed in accordance with examples as disclosed herein.

At 615, the method may include moving one or more components of the stretching member to apply a force to the deformable band, wherein stretching the deformable band is based at least in part on applying the force. The operations of 615 may be performed in accordance with examples as disclosed herein.

At 620, the method may include stretching the deformable band to create tension in the deformable band across at least a portion of the inner housing member, the tension comprising at least axial tension across one or more cutouts in the inner housing member. The operations of 620 may be performed in accordance with examples as disclosed herein.

At 625, the method may include injecting a fillable material through an opening in the wearable ring device such that the fillable material fills the one or more cutouts and contacts the deformable band. The operations of 625 may be performed in accordance with examples as disclosed herein.

It should be noted that the methods described above describe possible implementations, and that the operations and the steps may be rearranged or otherwise modified and that other implementations are possible. Furthermore, aspects from two or more of the methods may be combined.

A method is described. The method may include positioning a deformable band through an inner circumference of an inner housing member of a wearable ring device, stretching the deformable band to create tension in the deformable band across at least a portion of the inner housing member, the tension comprising at least axial tension across one or more cutouts in the inner housing member, and injecting a fillable material through an opening in the wearable ring device such that the fillable material fills the one or more cutouts and contacts the deformable band.

An apparatus is described. The apparatus may include a processor, memory coupled with the processor, and instructions stored in the memory. The instructions may be executable by the processor to cause the apparatus to position a deformable band through an inner circumference of an inner housing member of a wearable ring device, stretch the deformable band to create tension across at least a portion of the inner housing member, the tension comprising at least axial tension across one or more cutouts in the inner housing member, and inject a fillable material through an opening in the wearable ring device such that the fillable material fills the one or more cutouts and contacts the deformable band.

Another apparatus is described. The apparatus may include means for positioning a deformable band through an inner circumference of an inner housing member of a wearable ring device, means for stretching the deformable band to create tension in the deformable band across at least a portion of the inner housing member, the tension comprising at least axial tension across one or more cutouts in the inner housing member, and means for injecting a fillable material through an opening in the wearable ring device such that the fillable material fills the one or more cutouts and contacts the deformable band.

A non-transitory computer-readable medium storing code is described. The code may include instructions executable by a processor to position a deformable band through an inner circumference of an inner housing member of a wearable ring device, stretch the deformable band to create tension across at least a portion of the inner housing member, the tension comprising at least axial tension across one or more cutouts in the inner housing member, and inject a fillable material through an opening in the wearable ring device such that the fillable material fills the one or more cutouts and contacts the deformable band.

Some examples of the method, apparatuses, and non-transitory computer-readable medium described herein may further include operations, features, means, or instructions for position a stretching member within the deformable band and moving one or more components of the stretching member to apply a force to the deformable band, wherein stretching the deformable band may be based at least in part on applying the force.

In some examples of the method, apparatuses, and non-transitory computer-readable medium described herein, moving the one or more components may include operations, features, means, or instructions for moving the first set of arms, the second set of arms, or both, in one or more directions to stretch the deformable band.

In some examples of the method, apparatuses, and non-transitory computer-readable medium described herein, moving the first set of arms, the second set of arms, or both may include operations, features, means, or instructions for moving the first set of arms in a first lateral direction and the second set of arms in a second lateral direction, wherein the first lateral direction may be opposite the second lateral direction.

In some examples of the method, apparatuses, and non-transitory computer-readable medium described herein, moving the first set of arms, the second set of arms laterally, or both may include operations, features, means, or instructions for moving a first arm of the first set of arms in a first vertical direction and a second arm of the first set of arms in a second vertical direction, wherein the first vertical direction may be opposite the second vertical direction and moving a first arm of the second set of arms in the first vertical direction and a second arm of the second set of arms in the second vertical direction.

In some examples of the method, apparatuses, and non-transitory computer-readable medium described herein, stretching the deformable band may include operations, features, means, or instructions for stretching the deformable band to create tension based at least in part on a tension threshold, wherein the tension threshold may be based at least in part on a material of the deformable band, the fillable material, a size of the wearable ring device, or any combination thereof.

In some examples of the method, apparatuses, and non-transitory computer-readable medium described herein, injecting the fillable material may include operations, features, means, or instructions for injecting the fillable material according to a pressure threshold, wherein the pressure threshold may be based at least in part on a speed at which the fillable material may be injected, a material of the deformable band, the fillable material, a size of the wearable ring device, a size of the one or more cutouts, a quantity of the one or more cutouts, the axial tension across the one or more cutouts in the inner housing member, or any combination thereof.

In some examples of the method, apparatuses, and non-transitory computer-readable medium described herein, injecting the fillable material such that the fillable material fills the one or more cutouts and contacts the deformable band may include operations, features, means, or instructions for injecting the fillable material such that the fillable material contacts the deformable band without further deforming the deformable band where the fillable material contacts the deformable band.

In some examples of the method, apparatuses, and non-transitory computer-readable medium described herein, the wearable ring device further comprises an outer housing member, the outer housing member coupled with the inner housing member to form the wearable ring device.

In some examples of the method, apparatuses, and non-transitory computer-readable medium described herein, the opening in the wearable ring device may be an opening in the outer housing member of the wearable ring device.

In some examples of the method, apparatuses, and non-transitory computer-readable medium described herein, injecting the fillable material through the opening in the wearable ring device may include operations, features, means, or instructions for injecting the fillable material into a cavity of the wearable ring device, the cavity comprising space between the inner housing member and the outer housing member.

A method is described. The method may include an inner housing member of a wearable ring device comprising one or more cutouts, a deformable band configured to stretch upon an applied force, the stretched deformable band configured to create axial tension across the one or more cutouts in the inner housing member, and a stretching member configured to apply the force to stretch the deformable band.

An apparatus is described. The apparatus may include a processor, memory coupled with the processor, and instructions stored in the memory. The instructions may be executable by the processor to cause the apparatus to an inner housing member of a wearable ring device comprise one or more cutouts, a deformable band configure to stretch upon an applied force, the stretched deformable band configured to create axial tension across the one or more cutouts in the inner housing member, and a stretching member configure to apply the force to stretch the deformable band.

Another apparatus is described. The apparatus may include means for an inner housing member of a wearable ring device comprising one or more cutouts, means for a deformable band configured to stretch upon an applied force, the stretched deformable band configured to create axial tension across the one or more cutouts in the inner housing member, and means for a stretching member configured to apply the force to stretch the deformable band.

A non-transitory computer-readable medium storing code is described. The code may include instructions executable by a processor to an inner housing member of a wearable ring device comprise one or more cutouts, a deformable band configure to stretch upon an applied force, the stretched deformable band configured to create axial tension across the one or more cutouts in the inner housing member, and a stretching member configure to apply the force to stretch the deformable band.

In some examples of the method, apparatuses, and non-transitory computer-readable medium described herein, the stretching member comprises one or more sets of arms configured to move in one or more lateral directions, one or more vertical directions, or both, to apply the force.

In some examples of the method, apparatuses, and non-transitory computer-readable medium described herein, each arm of the one or more sets of arms comprises a straight portion and a curved portion.

In some examples of the method, apparatuses, and non-transitory computer-readable medium described herein, the curved portion may be based at least in part on a size of the wearable ring device.

In some examples of the method, apparatuses, and non-transitory computer-readable medium described herein, an outer housing member of the wearable ring device, the outer housing member coupled with the inner housing member to form the wearable ring device.

In some examples of the method, apparatuses, and non-transitory computer-readable medium described herein, the outer housing member comprises one or more openings configured to allow fillable material to enter a cavity between the inner housing member and the outer housing member.

In some examples of the method, apparatuses, and non-transitory computer-readable medium described herein, an injection system configured to inject a fillable material through an opening in the wearable ring device such that the fillable material fills the one or more cutouts and contacts the deformable band.

In some examples of the method, apparatuses, and non-transitory computer-readable medium described herein, the injection system may be further configured to inject the fillable material according to a pressure threshold based at least in part on a speed at which the fillable material may be injected, a material of the deformable band, the fillable material, a size of the wearable ring device, a size of the one or more cutouts, a quantity of the one or more cutouts, the axial tension across the one or more cutouts in the inner housing member, or any combination thereof.

In some examples of the method, apparatuses, and non-transitory computer-readable medium described herein, the stretching member may be further configured to apply the force according to a tension threshold based at least in part on a material of the deformable band, a fillable material, a size of the wearable ring device, or any combination thereof.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of manufacturing, comprising:
   positioning a deformable band through an inner circumference of an inner housing member of a wearable ring device;
   stretching the deformable band to create tension in the deformable band across at least a portion of the inner housing member, the tension comprising at least axial tension across one or more cutouts in the inner housing member; and
   injecting a fillable material through an opening in the wearable ring device such that the fillable material fills the one or more cutouts and contacts the deformable band.

2. The method of claim 1, further comprising:
   position a stretching member within the deformable band; and
   moving one or more components of the stretching member to apply a force to the deformable band, wherein stretching the deformable band is based at least in part on applying the force.

3. The method of claim 2, wherein the one or more components comprises a first set of arms and a second set of arms, and wherein moving the one or more components comprises:
   moving the first set of arms, the second set of arms, or both, in one or more directions to stretch the deformable band.

4. The method of claim 3, wherein moving the first set of arms, the second set of arms, or both, comprises:
   moving the first set of arms in a first lateral direction and the second set of arms in a second lateral direction, wherein the first lateral direction is opposite the second lateral direction.

5. The method of claim 3, wherein moving the first set of arms, the second set of arms laterally, or both, comprises:
   moving a first arm of the first set of arms in a first vertical direction and a second arm of the first set of arms in a second vertical direction, wherein the first vertical direction is opposite the second vertical direction; and
   moving a first arm of the second set of arms in the first vertical direction and a second arm of the second set of arms in the second vertical direction.

6. The method of claim 1, wherein stretching the deformable band comprises:
   stretching the deformable band to create tension based at least in part on a tension threshold, wherein the tension threshold is based at least in part on a material of the deformable band, the fillable material, a size of the wearable ring device, or any combination thereof.

7. The method of claim 1, wherein injecting the fillable material comprises:
   injecting the fillable material according to a pressure threshold, wherein the pressure threshold is based at least in part on a speed at which the fillable material is injected, a material of the deformable band, the fillable material, a size of the wearable ring device, a size of the one or more cutouts, a quantity of the one or more cutouts, the axial tension across the one or more cutouts in the inner housing member, or any combination thereof.

8. The method of claim 1, wherein injecting the fillable material such that the fillable material fills the one or more cutouts and contacts the deformable band comprises:
   injecting the fillable material such that the fillable material contacts the deformable band without further deforming the deformable band where the fillable material contacts the deformable band.

9. The method of claim 1, wherein the wearable ring device further comprises an outer housing member, the outer housing member coupled with the inner housing member to form the wearable ring device.

10. The method of claim 9, wherein the opening in the wearable ring device is an opening in the outer housing member of the wearable ring device.

11. The method of claim 9, wherein injecting the fillable material through the opening in the wearable ring device comprises:
   injecting the fillable material into a cavity of the wearable ring device, the cavity comprising space between the inner housing member and the outer housing member.

* * * * *